United States Patent [19]
Komiya et al.

[11] Patent Number: 5,778,280
[45] Date of Patent: Jul. 7, 1998

[54] IMAGE FORMING APPARATUS WHICH CORRECTS FOR MISREGISTRATION

[75] Inventors: Kenichi Komiya; Koji Tanimoto, both of Kanagawa-ken; Naoaki Ide, Shizuoka-ken, all of Japan

[73] Assignee: Kabushiki Kaisha Toshiba, Kawasaki, Japan

[21] Appl. No.: 613,238

[22] Filed: Mar. 8, 1996

[30] Foreign Application Priority Data

Mar. 24, 1995 [JP] Japan .................... 7-065502

[51] Int. Cl.$^6$ ............................ G03G 15/00
[52] U.S. Cl. ............... 399/49; 347/116; 399/301
[58] Field of Search ............ 399/49, 301; 347/116; 358/526

[56] References Cited

U.S. PATENT DOCUMENTS

| | | | |
|---|---|---|---|
| 4,912,491 | 3/1990 | Hoshino et al. | 347/116 |
| 4,916,547 | 4/1990 | Katsumata et al. | 358/300 |
| 5,418,556 | 5/1995 | Andrews | 347/116 |
| 5,452,073 | 9/1995 | Kataoka | 347/116 X |
| 5,523,823 | 6/1996 | Ashikaga | 347/116 X |
| 5,587,771 | 12/1996 | Mori et al. | 347/116 X |

Primary Examiner—William J. Royer
Attorney, Agent, or Firm—Foley & Lardner

[57] ABSTRACT

An image forming apparatus including a plurality of latent image forming units for forming latent images on a plurality of image carriers, a plurality of developing devices for forming developed images by developing the latent images formed by the latent image forming units, and an image conveyer belt for conveying the developed images formed by the developing devices. The image forming apparatus further contains a registration sensor for detecting the developed images conveyed on the image conveyer belt, and the registration sensor has a light source, a first optical fiber element for guiding the light from the light source and illuminating the image conveyer belt to obtain the reflected light, a second optical fiber element for guiding the reflected light in a specified direction, and a light receiving element for converting the reflected light guided by the second optical fiber element into an electric signal. The image forming apparatus has a computing device for a computing misregistration correcting amount to correct the misregistration of each of the developed images conveyed by the image conveyer belt based on the detecting result of the registration sensor and executes the correction of the misregistration based on the computed result of the computing device.

26 Claims, 33 Drawing Sheets

MAIN SCANNING DIRECTION

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | 0 | 0 | 0 | 0 | 0 | 0 | 0 | 0 | 0 | 0 | 0 | 0 | 0 | 0 | 0 | 0 |
| 2 | F | F | F | F | F | F | F | F | F | F | F | F | F | F | F | F |
| 3 | 0 | 0 | 0 | 0 | 0 | 0 | 0 | 0 | 0 | 0 | 0 | 0 | 0 | 0 | 0 | 0 |

SUB-SCANNING DIRECTION

*Fig. 10A*

MAIN SCANNING DIRECTION

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | 0 | 0 | 0 | 0 | 0 | 0 | 0 | 0 | 0 | 0 | 0 | 0 | 0 | 0 | 0 | 0 |
| 2 | F | F | F | F | F | F | F | F | F | F | F | F | F | F | F | F |
| 3 | 0 | 0 | 0 | 0 | 0 | 0 | 0 | 0 | 0 | 0 | 0 | 0 | 0 | 0 | 0 | 0 |

SUB-SCANNING DIRECTION

*Fig. 10B*

MAIN SCANNING DIRECTION

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | 0 | 0 | 0 | 0 | 0 | 0 | 0 | 0 | 0 | 0 | 0 | 0 | 0 | 0 | 0 | 0 |
| 2 | F | E,l | D,l | C,l | B,l | A,l | 9,l | 8,l | 7,l | 6,l | 5,l | 4,l | 3,l | 2,l | 1,l | 0 |
| 3 | 0 | 1,u | 2,u | 3,u | 4,u | 5,u | 6,u | 7,u | 8,u | 9,u | A,u | B,u | C,u | D,u | E,u | F |

SUB-SCANNING DIRECTION

*Fig. 10C*

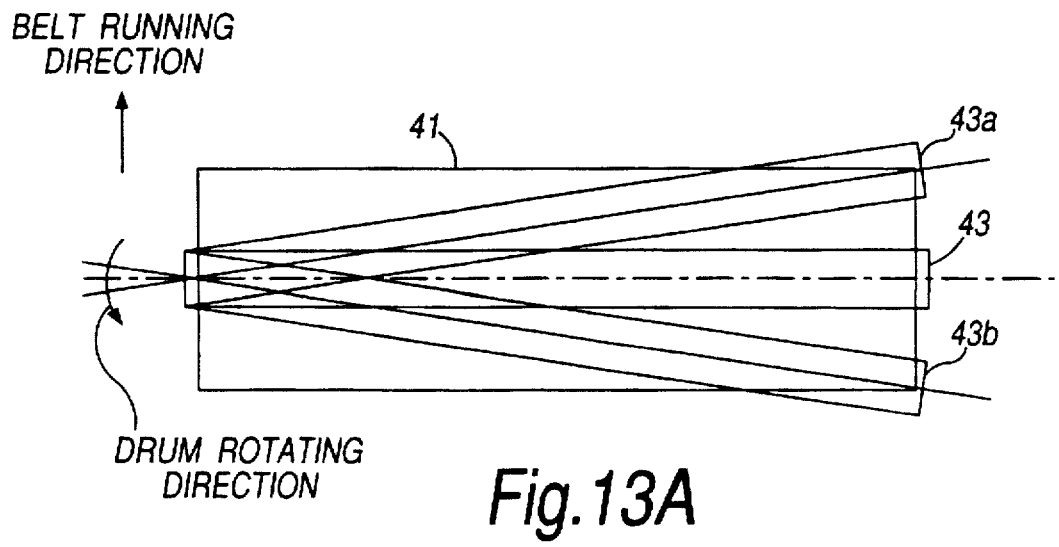

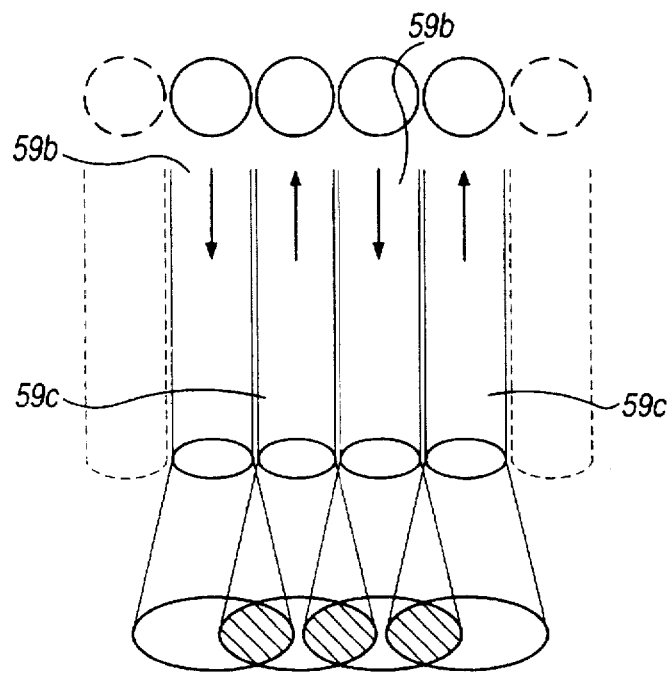
*Fig.27*
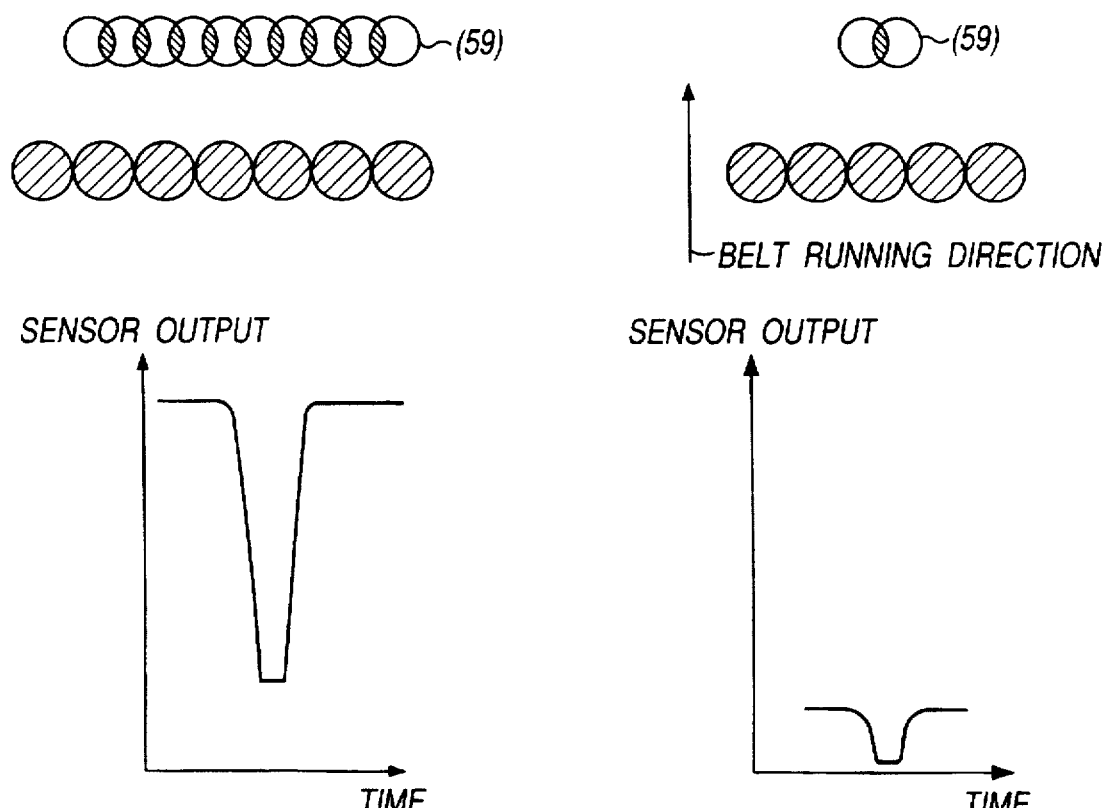
*Fig.28A*  *Fig.28B*

IMAGE FORMING APPARATUS WHICH CORRECTS FOR MISREGISTRATION

BACKGROUND OF THE INVENTION

1. Field of the Invention

The present invention relates to a transfer type color image forming apparatus which forms an image for each color component on a plurality of photosensitive drums and superposes color images on each other on a recording paper, and is applicable to a color laser beam printer or a color digital copying machine.

2. Description of the Related Art

A transfer type color image forming apparatus has a first through a fourth image forming units which form four corresponding color images based on four image data of yellow (hereinafter, shown as Y), magenta (a kind of red, hereinafter, shown as M), cyan (bluish purple, hereinafter, shown as C) and black (hereinafter, shown as B) which were decomposed according to a well-known subtractive color process, a paper conveying mechanism for conveying paper to retain images formed by the first through the fourth image forming units, and a fixing device for fixing toner images on the paper conveyed through the paper conveying mechanism.

The first through the fourth image forming units include photosensitive drums which retain electrostatic latent images corresponding to image data which were decomposed into respective color components.

There are a charging device, an exposing device or an imaging bar, a developing device and a transfer device in order in the vicinity of each photosensitive drum. The charging device supplies a prescribed uniform electric charge to the surface of each photosensitive drum. The exposing device forms an electrostatic latent image on the charged photosensitive drum by applying laser beams corresponding to image data. An imaging bar records image data electrostatically on each photosensitive drum. The developing device forms a toner image by supplying a toner in color corresponding to an electrostatic latent image formed on the photosensitive drum. The transfer device transfers a toner image formed on the photosensitive drum on a paper conveyed by the paper conveying mechanism. A paper is conveyed to respective photosensitive drums of the first through the fourth image forming units successively and color toner images formed on respective photosensitive drums are transferred one upon another on the recording paper.

The paper conveying mechanism includes a conveyer belt which is formed in an endless shape and movable in the specified direction between the photosensitive drums of the first through the fourth image forming units and the transfer device. By moving the conveyer belt in the state with a paper electrostatically adsorbed thereto at a constant speed, toner images formed by respective image forming units corresponding to respective color components are superposed on each other on a paper at respective transfer positions. Further, the paper with the toner images transferred thereon is conveyed to the fixing device at the rear stage.

The fixing device includes a pair of upper and lower heating mechanisms and when a paper passes between these heating mechanisms, the paper and a toner image on the paper are heated to fuse and fix the toner image on the paper.

By the way, if toner images in respective color components are not accurately superposed on each other successively, a misregistration of color images is produced on this kind of transfer type color image forming apparatus. Factors causing the misregistration of color images may be a tilt or a misregistration of position peculiar to the image forming unit, divergence of image forming timing of images formed through the image forming units and a misregistration of the transfer positions when images are superposed on a paper.

From the above, a number of methods to detect and correct the misregistration of color images have been so far proposed. For instance, a method to detect a misregistration of toner images corresponding to respective color components at a high accuracy by a cheap optical sensor and a sensor aperture in a peculiar shape has been disclosed in Japanese Patent Disclosure No. 06-278322. In addition, a method to eliminate a misregistration of color images by changing timings for forming latent images on the photosensitive drums based on the misregistration of the detected toner images also has been disclosed.

However, the method disclosed in the Japanese Patent Disclosure No. 06-278322 to detect the misregistration of toner images has such a problem that a highly accurate shape of the sensor aperture and a highly accurate mounting of the optical sensor are demanded. This will reduce a cost of a sensor to detect a misregistration of color images on a transfer type color image forming apparatus but increase a cost for assembling the apparatus.

Further, as the conveyer belt of the paper conveying mechanism to convey paper is formed using a member with a mirror surface or has a similar reflecting characteristic in many cases, there is a problem that the surface may be scratched by a paper and the reflecting light is applied to a misregistration sensor as if there is a paper. This will cause such problems that if slight flaws are produced on the conveyer belt, a replacement of the conveyer belt becomes necessary, thus increasing a running cost.

SUMMARY OF THE INVENTION

It is an object of the present invention to provide an image forming apparatus which produces no misregistration of color images when toner images corresponding to color components are superposed on each other.

According to the present invention, there is provided an image forming apparatus comprising a plurality of latent image forming means for forming latent images on a plurality of image carriers; a plurality of developing means, arranged corresponding to the image carriers, for forming developed images by developing the latent images formed by the latent image forming means; means for conveying the developed images formed by the developing means; means for detecting the developed images being conveyed on the image conveying means, the detecting means including a light source, a first optical fiber element for guiding a light from the light source and illuminating the image conveying means to obtain the reflected light, a second optical fiber element for guiding the reflected light in the specified direction, and a light receiving element for converting the reflected light guided by the second optical fiber element into an electric signal; means for computing misregistration correcting amount to correct the misregistration of each of the developed images conveyed by the image conveying means based on the detecting result of the detecting means; and means for executing correction of the misregistration based on the computed result of the computing means.

BRIEF DESCRIPTION OF THE DRAWINGS

FIGS. 10A, 10B and 10C are schematic diagrams showing examples of driving data of imaging bars for forming image data corresponding to image data obtained by the rearrangement of the image data shown in FIGS. 9A, 9B and 9C;

FIG. 12A and 12B are schematic diagrams for explaining other examples of a method for rearranging image data to correct the tilted misregistration shown in FIG. 8;

FIG. 13B is a schematic top view showing the tilted state of an imaging bar to a photosensitive drum of a fourth image forming unit;

FIG. 27 is a schematic diagram showing a third embodiment of the misregistration detecting mechanism;

FIG. 28A and 28B are schematic diagrams showing examples of outputs obtained by the misregistration detecting mechanism shown in FIG. 27;

DETAILED DESCRIPTION OF THE PREFERRED EMBODIMENTS

Hereinafter, preferred embodiments of the present invention will be described in detail referring to the attached drawings.

Figure 1:
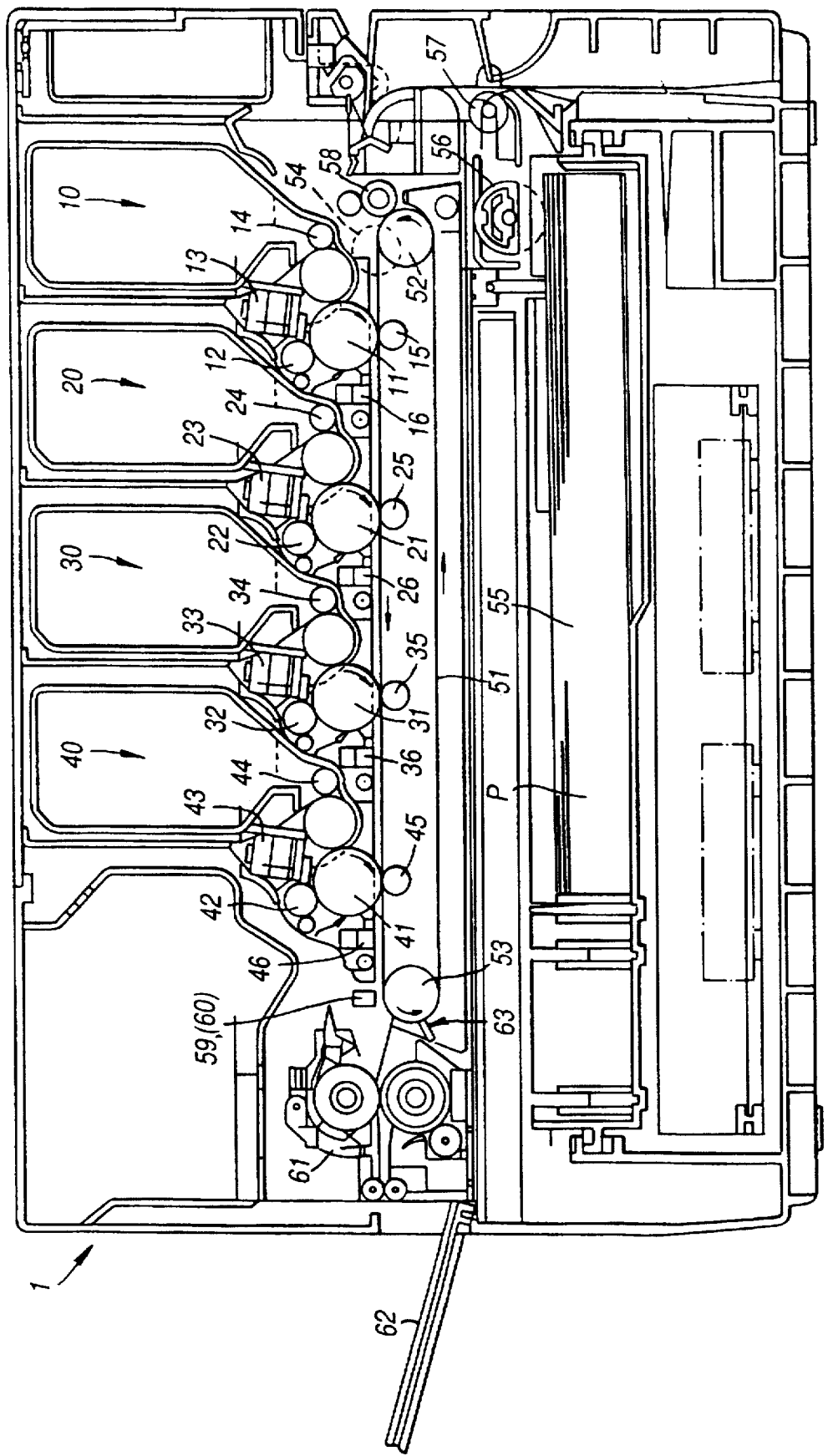
FIG. 1 is a schematic sectional view showing an image forming apparatus of the present invention.
Figure 2:
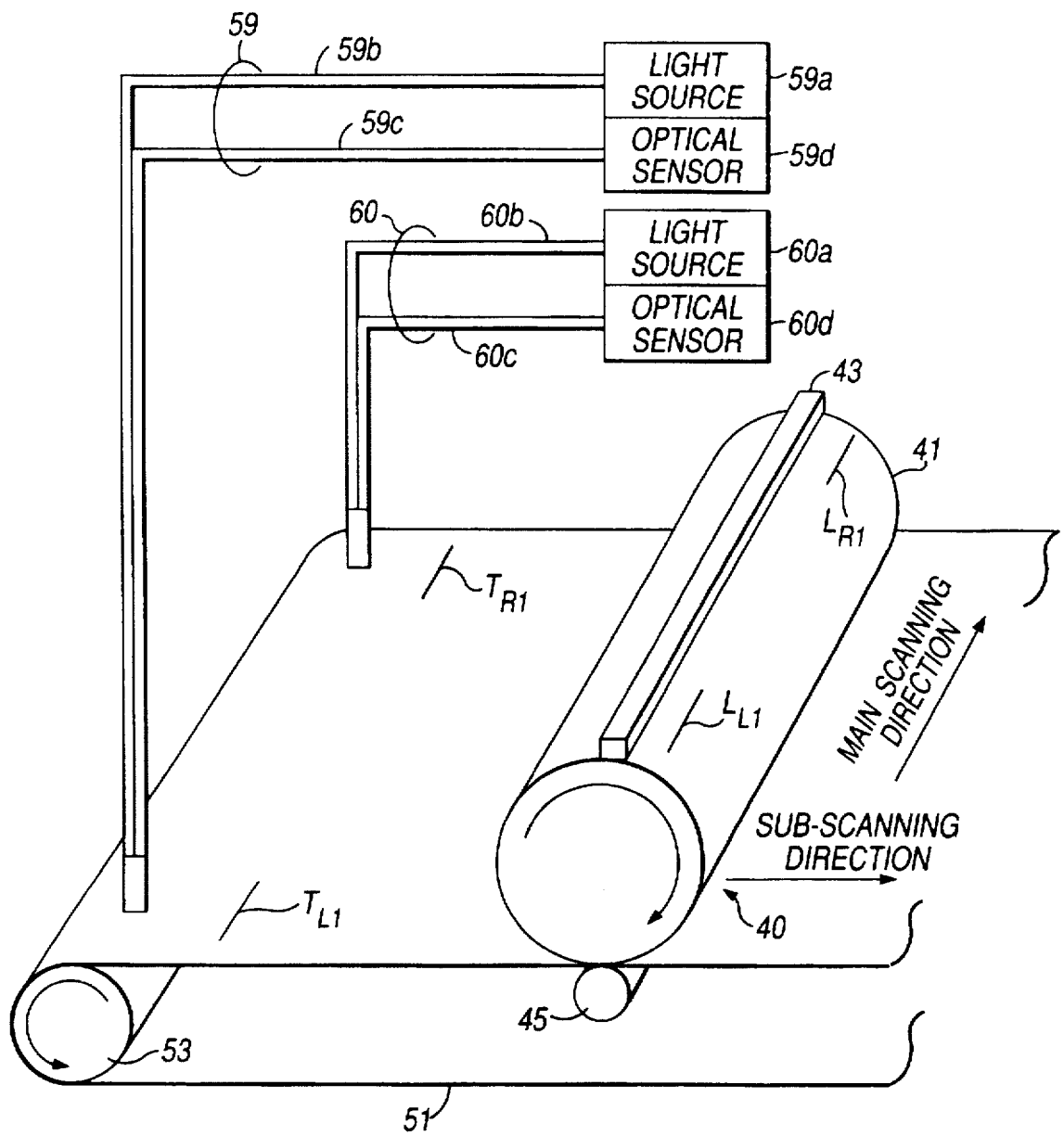
FIG. 2 is a schematic diagram showing a first embodiment of a misregistration detecting mechanism to detect misregistration of images, applicable to the image forming apparatus shown in FIG. 1.
Figure 3:
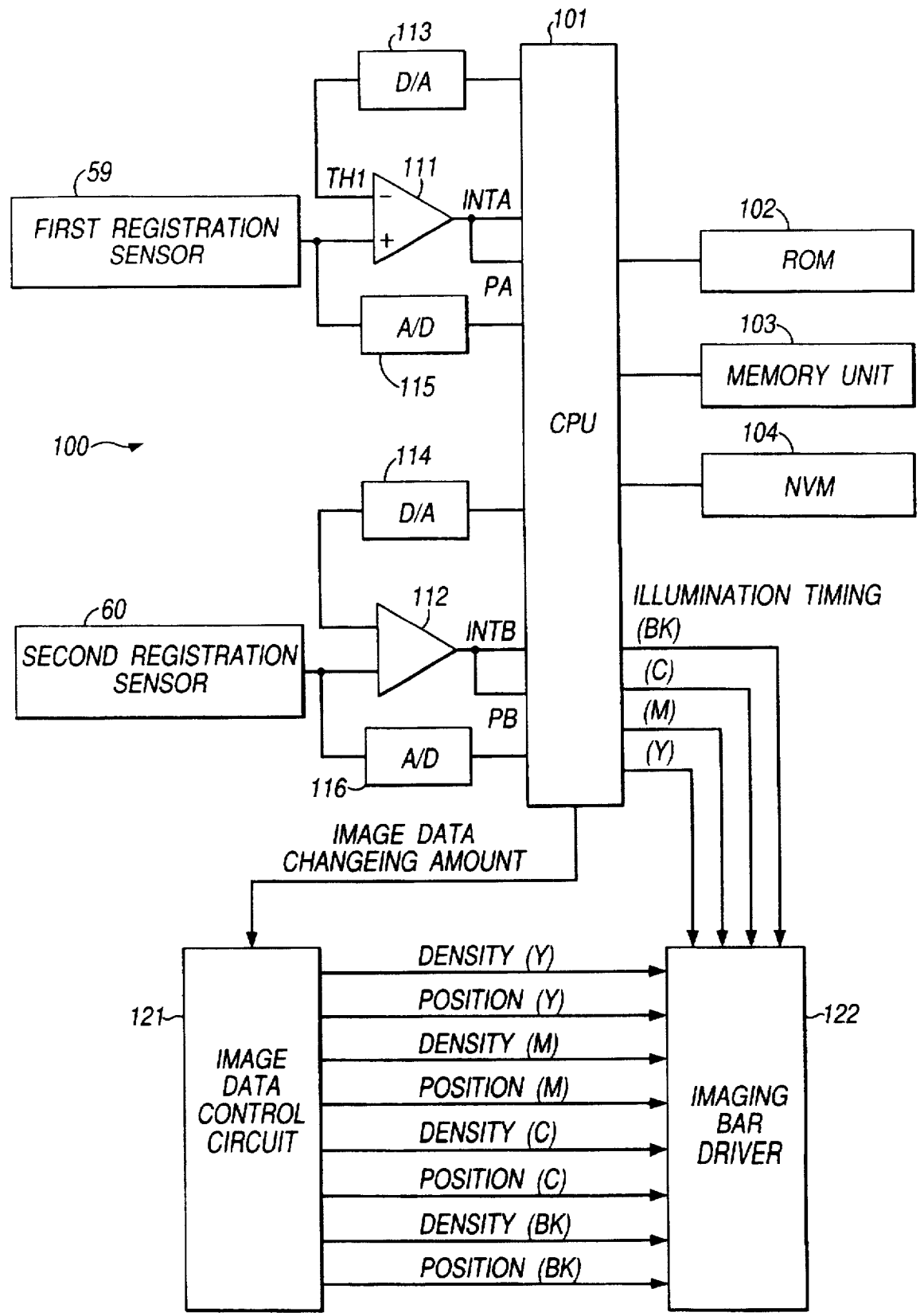
FIG. 3 is a schematic block diagram showing a controller of the image forming apparatus shown in FIG. 1.

FIG. 1 shows an image forming apparatus of the present invention. FIG. 2 is a partial schematic diagram extracting essential component parts of the image forming apparatus shown in FIG. 1 and FIG. 3 is a block diagram showing an example of the controller of the image forming apparatus shown in FIG. 1.

In FIG. 1, an image forming apparatus 1 has a first through a fourth image forming units 10, 20, 30 and 40 and a conveyer belt 51 to convey a paper P in the arrow direction, on which images formed by respective image forming units 10, 20, 30 and 40 are to be transferred. The image forming units 10, 20, 30 and 40 are arranged in series along the conveyer belt 51.

The image forming units 10, 20, 30 and 50 include photosensitive drums 11, 21, 31 and 41 which are image carriers of which outer surfaces are formed rotatable in the same direction at a location contacting the conveyer belt 51.

The photosensitive drums 11, 21, 31 and 41 are arranged so that their axial lines become orthogonal to the direction in which images formed on respective drums are conveyed by the conveyer belt 51. Hereinafter, the direction of axial line of the photosensitive drums will be shown as the main scanning direction and the direction in which the photosensitive drums are rotated, that is, the rotary direction of the conveyer belt 51 as the sub-scanning direction.

Around the photosensitive drums 11, 21, 31 and 41, there are charging rollers 12, 22, 32 and 42 as charging means, imaging bars 13, 23, 33 and 43 as latent image forming means, developing devices 14, 24, 34 an 44 as developing means, transfer rollers 15, 25, 35 and 45 as transfer means, and cleaners 16, 26, 36 and 46 extending in the main scanning direction, respectively arranged in order along the rotary direction of corresponding photosensitive drums, respectively.

Imaging bars 13, 23, 33 and 43 are arranged so that light emitting timings of light sources corresponding to image data can be moved to the upstream side or the downstream side of memory areas which are provided continuously in the sub-scanning direction according to location information to correct tilted misregistrations of images. Imaging bars of which luminous quantity is adjustable based on density information shown in 16 steps, for instance, 0, 1 through 9 and A through E and F, are used.

The image forming units 10, 20, 30 and 40 form images in colors corresponding to decomposed color components, that is, yellow (hereinafter, shown as Y), magenta (a kind of red, hereinafter referred to as M), cyan (bluish purple, hereinafter referred to as C) and black (hereinafter referred to as B) images, respectively. In this embodiment, the image forming units 10, 20, 30 and 40 are corresponding to Y, M, C and B images, respectively and therefore, color developers or toners corresponding to Y, M, C and B are accommodated in the developing devices 14, 24, 34 and 44, respectively.

The conveyer belt 51 is rotated in the arrow direction when supporting rollers 52 and 53 are rotated counterclockwise. Further, one of the supporting rollers 52 and 53, for instance, the supporting roller 52 which is arranged in close vicinity to the image forming unit 10 is rotated by a motor 54.

Under the conveyer belt 51, there is arranged a cassette 55 which accommodates image receiving media, for instance, paper P. The paper P accommodated in the cassette 55 is taken out of the cassette 55 by a paper supply roller 56, which is rotated at a specified timing, and guided to an aligning roller 58 via a feed roller 57.

At the downstream side in the direction in which the conveyer belt 51 is rotated, there are arranged two sets of registration sensors 59 and 60 with a specified space in the main scanning direction for detecting locations of toner images transferred to the conveyer belt 51.

In the vicinity of the supporting roller 53, there is provided a fixing device 61 for fixing toner images in respective colors on the paper P, which are formed by the first through the fourth image forming units 10, 20, 30 and 40 and superposed on each other on the paper P on the conveyer belt 51 via the corresponding transfer rollers 15, 25, 35 and 45. At the outside of the color image forming apparatus 1, a tray 62 is attached for retaining the paper P with a toner image fixed and ejected from the image forming apparatus 1. Further, in the vicinity of the supporting roller 53, there is arranged a belt cleaner 63 for removing paper residues, contamination, etc. produced from toners and paper P adhered to the conveyer belt 51.

A controller 100 of the image forming apparatus shown in FIG. 1 is schematically shown in FIG. 3.

As shown in FIG. 3, the controller 100 of the image forming apparatus has a CPU 101 as a main controller, a ROM 102 connected thereto, a memory unit 103 and a non-volatile memory 104 (hereinafter referred to as NVM). The ROM 102 stores initial data which are used for initializing the image forming apparatus. The memory unit 103 includes a buffer memory, a page memory and a bit map memory, stores image data input from an external apparatus (not shown) temporarily and is used for developing image data to be printed. The NVM 104 stores various control data computed for correcting misregistration of color images.

A first comparator 111 for taking out an image detecting signal from the first registration sensor 59 and a second comparator 112 for taking out an image detecting signal from the second registration sensor 60 are connected to the CPU 101 via a first interrupt port INTA and a second interrupt port INTB, respectively. Further, an inverted input terminal of the first comparator 111 and an inverted input terminal of the second comparator 112 are connected to the CPU 101 via a first and a second D/A converters 113 and 114, respectively. Image detecting signals from the first registration sensor 59 and the second registration sensor 60 are also input to the CPU 101 through the first and the second A/D converters 115 and 116, respectively.

In addition, an image data control circuit 121 and an imaging bar driver 122 are connected to the CPU 101. The image data control circuit 121 changes density data and location data of image data which are supplied to the imaging bars 13, 23, 33 and 43 of the first through the fourth image forming units for correcting misregistration of color images. The imaging bar driver 122 has the light sources of respective imaging bars emit light based on image data which are changed by the image data control circuit 121.

Next, the operation of the image forming apparatus shown in FIGS. 1 through 3 will be described.

When the power switch (not shown) is turned ON, the image forming apparatus 1 is initialized and kept in the standby state.

Hereinafter, the process for forming a Y image will be explained referring to the first image forming unit 10. Further, needless to say, M, C and B images are formed similarly by the second through the fourth image forming units 20, 30 and 40.

The photosensitive drum 11 is rotated in the arrow direction and its surface is uniformly charged by the charging roller 12. In succession, Y image data corresponding to information to be recorded on the specified location of the photosensitive drum 11 by the imaging bar 13 is exposed and a Y electrostatic latent image corresponding to the image data supplied by the imaging bar 13 is formed on the surface of the photosensitive drum 11.

The latent image formed on the photosensitive drum 11 is developed by the developing device 14, which is accommodating Y toner, and converted into a Y toner image.

The Y toner image formed on the photosensitive drum 11 is transferred on the paper P by the transfer roller 15. That is, the paper P is taken out of the cassette 55 and aligned by the aligning roller 58. Thereafter, the paper P is conveyed to the location opposite to the photosensitive drum 11 while being adsorbed on the conveyer belt 51, and the Y toner image is transferred on the paper P by the transfer roller 15 at a location opposite to the photosensitive drum 11.

Hereinafter, the M, C and B toner images formed on the photosensitive drums 21, 31 and 41 by the second, third and fourth image forming units 20, 30 and 40, respectively are superposed to each other on the paper P that is conveyed by the conveyer belt 51. That is, in case of printing in multiple colors, the image forming operation of one cycle of process comprising charging, exposure, development and transfer is executed by the image forming units 10, 20, 30 and 40 and a toner image in multiple colors are transferred. Untransferred toners left on the photosensitive drums 11, 21, 31 and 41 are removed by cleaners 16, 26, 36 and 46, respectively.

The paper P with toner images transferred in respective colors is separated from the conveyer belt 51, conveyed to the fixing device 61 and after the image is heated, fused and fixed by the fixing device 61, the paper is ejected onto the tray 62.

Color toners and paper residues produced from the paper P and adhered to the conveyer belt 51 are removed by the belt cleaner 63.

On this type of image forming apparatus, as a misregistration of color images tends to be produced when a plurality of images formed for every color components are superposed on the paper P, many methods for superposing images in multiple colors have been so far proposed. Here, causes for producing misregistration of color images will be pursued and a method for removing the causes will be explained.

Figure 4A:
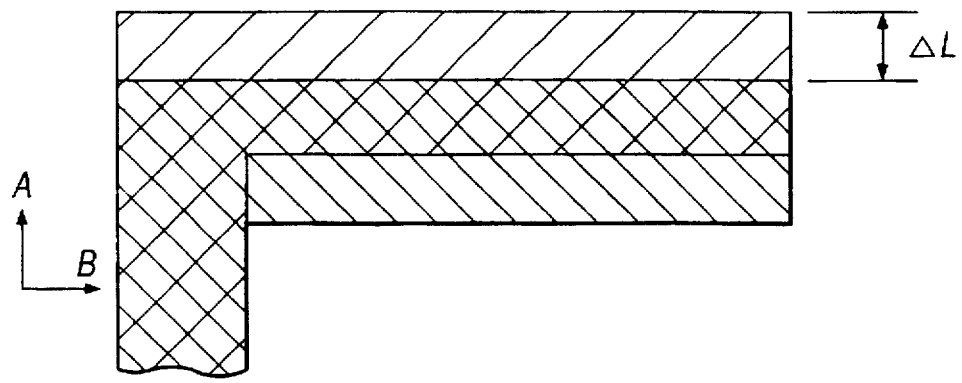
FIGS. 4A, 4B and 4C are schematic diagrams showing examples of respective misregistrations of images.
Figure 4B:
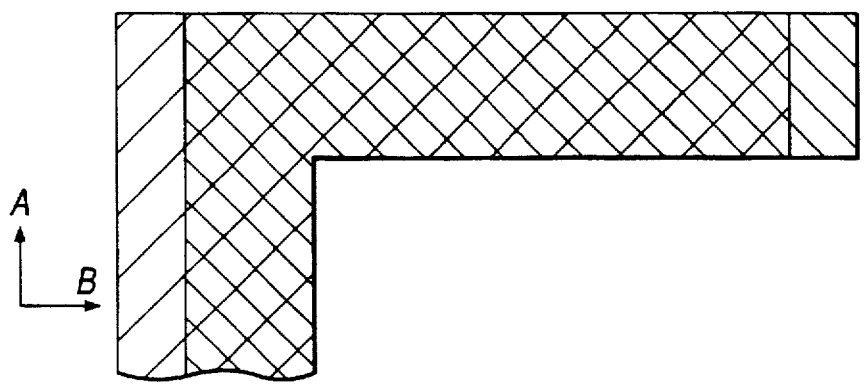
Figure 4C:
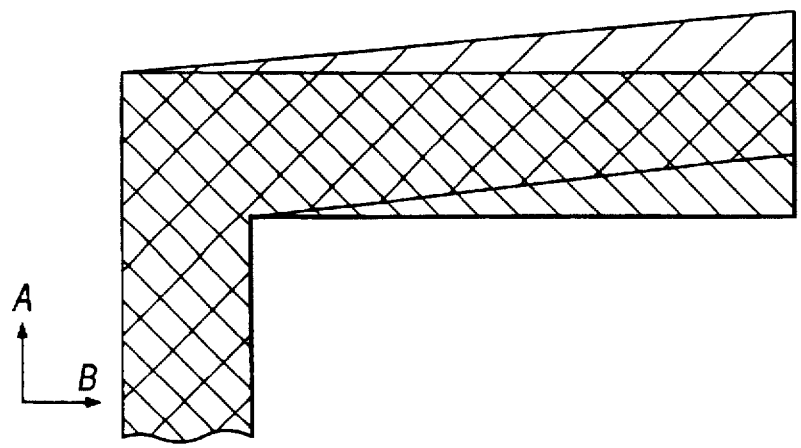

FIGS. 4A through 4C show kinds and features of misregistrations of color images.

A first misregistration is a directional misregistration indicated by an arrow A as shown in FIG. 4A, which is a misregistration of an image top line, that is, a positional misregistration in the sub-scanning direction. A second misregistration is a directional misregistration in the direction indication by an arrow B as shown in FIG. 4B, which is a misregistration of the exposure starting position, that is, a misregistration in the main scanning direction. A third misregistration is a tilted misregistration in both the main and sub-scanning directions as shown in FIG. 4C. Further, in many cases it is expected that the misregistrations shown in FIGS. 4A, 4B and 4C are produced mutually or in the all combined state.

Figure 5:
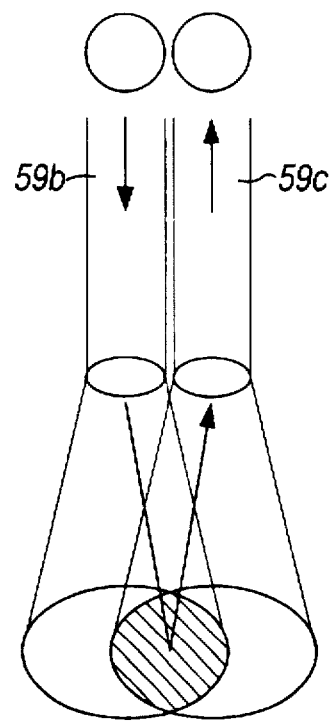
FIG. 5 is a schematic diagram showing a registration sensor of the misregistration detecting mechanism shown in FIG. 2.

FIG. 5 shows one example of the registration sensors 59 and 60 shown in FIG. 2. As the registration sensors 59 and 60 are substantially in the same construction, the registration sensor 59 will be used as a representative one in the explanation.

The registration sensor 59 has a light source 59a, a first optical fiber 59b to guide the light from the light source 59a to a specified location of the conveyer belt 51, and a second optical fiber 59c to take in the light reflected on the conveyer belt 51 and illuminated by the first optical fiber 59b and guide it to an optical sensor 59d. The optical sensor 59d is arranged in one united body with the light source 59a or in the vicinity of the light source 59a. The first optical fiber 59a and the second optical fiber 59c adjoin each other in the main scanning direction and are arranged vertical to the face of the conveyer belt 51. The detecting range, that is, detecting accuracy of the reflecting light from the conveyer belt 51, of the registration sensor 59 is defined by a diameter and numerical aperture of a fiber and a distance between the conveyer belt 51 and the end surface of the fiber shown in FIG. 6.

Figure 6:
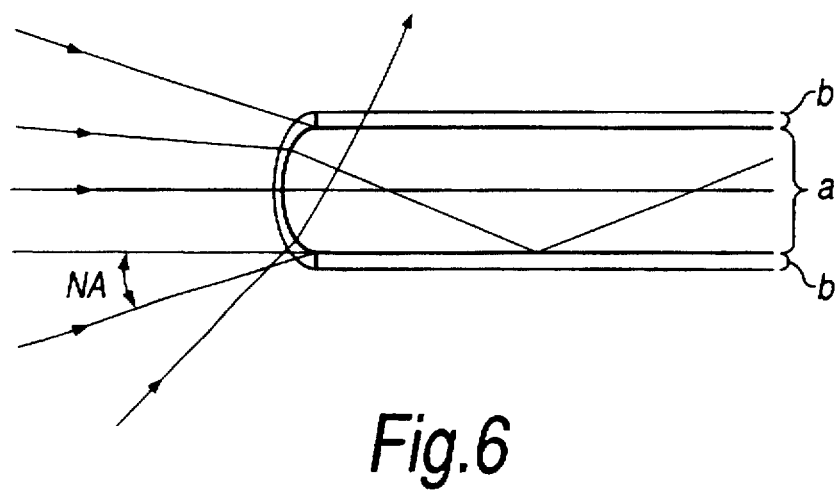
FIG. 6 is a schematic diagram showing an optical fiber and a range of misregistration detecting region used in the misregistration detecting mechanism shown in FIG. 2.

FIG. 6 shows characteristics of an optical fiber suited to the registration sensor shown in FIG. 5.

In general, an optical fiber has a core portion a and a cladding portion b and the running direction of the light transmitted to the inside of the fiber is changed at the interface of the core portion a and the cladding portion b, and is propagated from the incident side to the outgoing side.

The light output to the outside of the optical fiber from its outgoing side is diffused at a specified angle based on the numerical aperture NA.

In detail, the light from the light source 59a is transmitted through the core portion a of the first optical fiber 59b and is dispersed in a conical shape according to the numerical aperture NA of the optical fiber when output from the first optical fiber 59b. Similarly, when the light is input to the second optical fiber 59c, only the light within the range of the numerical aperture NA is guided into the optical fiber. That is, an undesired light incident to the optical fiber is restricted by the numerical aperture NA. Thus, the light guided by the first optical fiber 59b and the light in the oblique lined portion which is superposed by the incident light region are guided to the second optical fiber 59c. The detecting accuracy of the registration sensor 59 shown in FIG. 5 is defined by the diameters and the numerical apertures NA of the first and the second optical fibers and a distance between the apertures of the fibers and the conveyer belt 51.

From the above, if the outer diameter of an optical fiber is 500 μm, the diameter of the core portion a of the optical fiber is 480 μm, the numerical aperture NA is 0.5, and a distance between the end surface of the optical fiber and the conveyer belt 51 is 0.5 mm, the detecting accuracy becomes about 557 μm. As optical fibers in outer diameter of several μm are easily obtained, it is possible to achieve a high level of detecting accuracy by optimizing the combination.

Next, a method to remove a misregistration of color images formed by the image forming units 10, 20, 30 and 40 of the image forming apparatus 1 will be described.

When the image forming apparatus 1 is set in the adjusting mode through an operating panel (not shown), the first through the fourth image forming units 10, 20, 30 and 40 are instructed by the CPU 101 to print a test pattern. In this adjusting mode, the paper P is not conveyed from the cassette 55 by the paper supply roller 56 and the conveyer belt 51 only is rotated at a specified speed.

First, in connection with the tilted misregistration shown in FIG. 4C, a deviation of parallelism between the imaging bars of respective image forming units and corresponding photosensitive drums or a deviation of right angle between respective image forming units and the moving direction of the conveyer belt are detected.

In detail, a first and a second test pattern images $T_{L1}$ and $T_{R1}$ comprising a plurality of dot patterns lined up in the main scanning direction are formed at the location corresponding to the vicinity of the first and the second registration sensors 59 and 60 of the conveyer belt 51 by the fourth image forming unit 40 as shown in FIG. 2.

That is, the photosensitive drum 41 of the fourth image forming unit 40 is charged by the charging roller 42 to a specified potential under the control of the CPU 101. In succession, a pair of left and right test patterns $L_{L1}$ and $L_{R1}$ are exposed on the photosensitive drum 41 with a specified space in the main scanning direction at the same exposure timing by the imaging bar 43.

The first and the second test patterns $L_{L1}$ and $L_{R1}$ exposed on the photosensitive drum 41 are converted into an electrostatic latent image on the photosensitive drum 41. This electrostatic latent image is guided to the developing device 44 with the rotation of the photosensitive drum 41 and is converted into a first and a second test pattern images $T_{L1}$ and $T_{R1}$ as color images corresponding to the test patterns by a developing device 44.

The first and the second test pattern images $T_{L1}$ and $T_{R1}$ formed on the photosensitive drum 41 are conveyed to the transfer station opposite to the conveyer belt 51 with the rotation of the photosensitive drum 41 and are transferred on the conveyer belt 51 via the transfer roller 45. In the adjusting mode, the paper P is not used and the first and the second test pattern images $T_{L1}$ and $T_{R1}$ are transferred directly on the conveyer belt 51. The adjusting mode may be set by another method, for instance, the adjusting mode is set when the image forming apparatus is warmed up, is performed after each of a few hundred copying operations or is supplied with power.

The first and the second test pattern images $T_{L1}$ and $T_{R1}$ transferred on the conveyer belt 51 are moved to the fixing device 61 side with the rotation of the conveyer belt 51 and are guided into the detecting region opposite to the first and the second registration sensors 59 and 60.

The first test pattern image $T_{L1}$ conveyed by the conveyer belt 51 passes through the detecting region comprising the first optical fiber 59b and the second optical fiber 59c of the first registration sensor 59. The reflecting light from the conveyer belt 51 and the test pattern image $T_{L1}$ taken out by the second optical fiber 59c when passing through this detecting region is photoelectrically converted by the optical sensor 59d and input to the non-inverted input terminal of the first comparator 111. Further, the output from the CPU 101 for defining a first threshold level TH1 is converted to an analog signal via the D/A converter 113 and input to the inverted input terminal of the first comparator 111. As a result, the output satisfying the first threshold level TH1 is input to the first comparator 111 from the first registration sensor 59 and an interrupt signal is input to a port PA and a first interrupt port INTA of the CPU 101.

On the other hand, the test pattern image $T_{R1}$ passes through a detecting region formed by the first optical fiber 60b which guides light from a light source 60a and the second optical fiber 60c of the second registration sensor 60. The reflecting light from the conveyer belt 51 and the test pattern image $T_{R1}$ taken out by the second optical fiber 60c when passing through this detecting region is photoelectrically converted by the optical sensor 60d and input to the non-inverted input terminal of the second comparator 112. Further, the output from the CPU 101 for defining the first threshold level TH1 is converted to an analog signal via the D/A converter 114 and input to the inverted input terminal of the second comparator 112. As a result, the output satisfying the first threshold level TH1 is input to the second comparator 112 from the second sensor 60 and an interrupt signal is input to a port PB and a second interrupt port INTB of the CPU 101.

Accordingly, a time from the moment when the first and the second test pattern images $T_{L1}$ and $T_{R1}$ formed by the imaging bar of a corresponding image forming unit (here, the first image forming unit is taken as an example) were exposed until the first and the second test pattern images $T_{L1}$ and $T_{R1}$ were developed, transferred on the conveyer belt 51 and passed through the first and the second registration sensors 59 and 60 is accurately measured via the CPU 101. As shown in the flowchart in FIG. 7, at the point of time when the first and the second test pattern images $T_{L1}$ and $T_{R1}$ formed by the fourth image forming unit 40 were detected by the first and the second registration sensors 59 and 60, a degree of tilt against standard values of the first and the second test pattern images $T_{L1}$ and $T_{R1}$ in the main scanning direction, that is, the degree of tilt against the conveyer belt 51 of the first image forming unit 10 is computed from a time difference between a previously detected test pattern image and a successively detected test pattern image. If time difference =0 is satisfied, there is no tilt.

Figure 7:
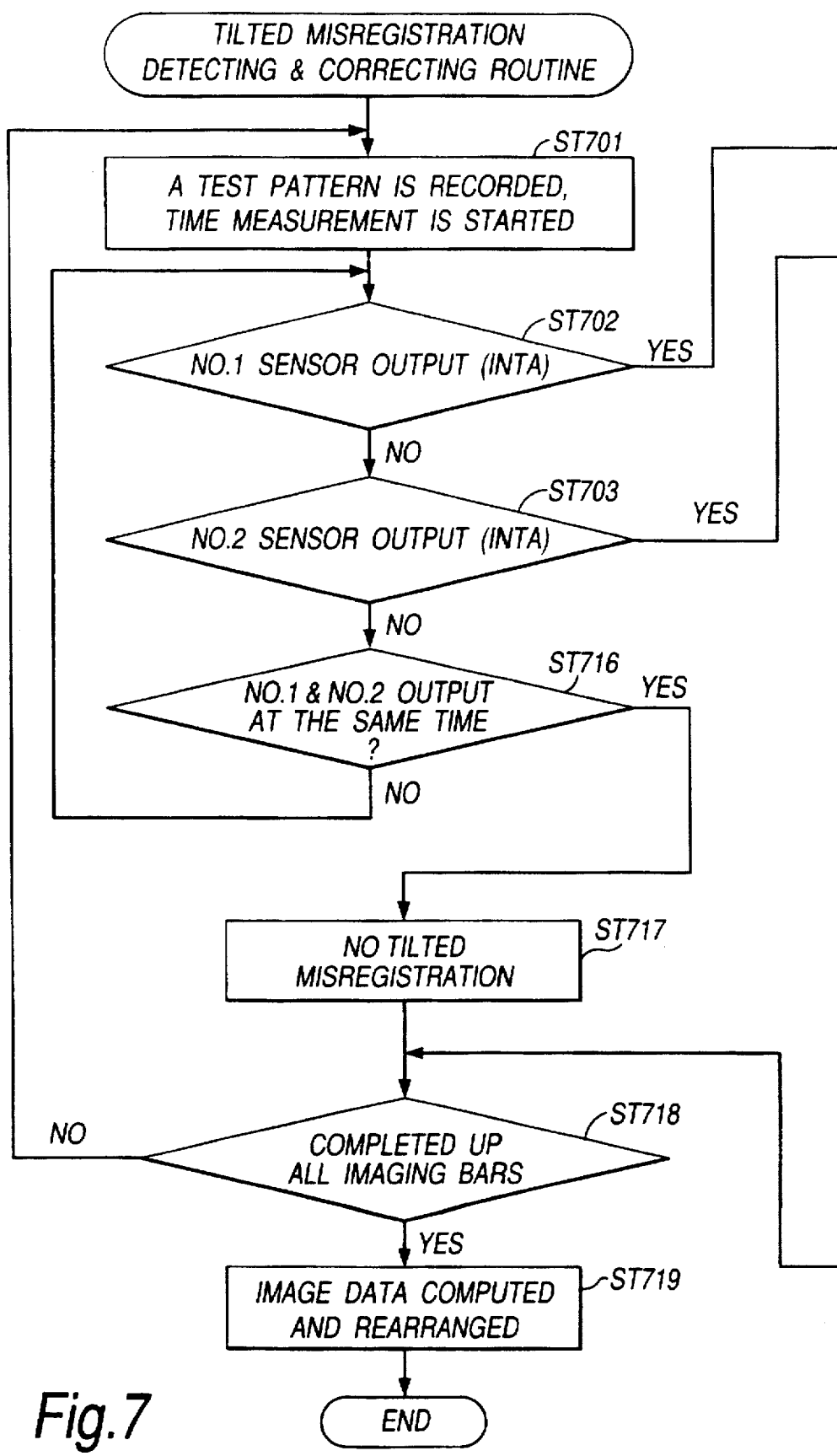
FIG. 7 is a flowchart showing one example of the operation for rearranging image data by detecting the tilted misregistration using the first embodiment shown in FIG. 2.
Figure 7:
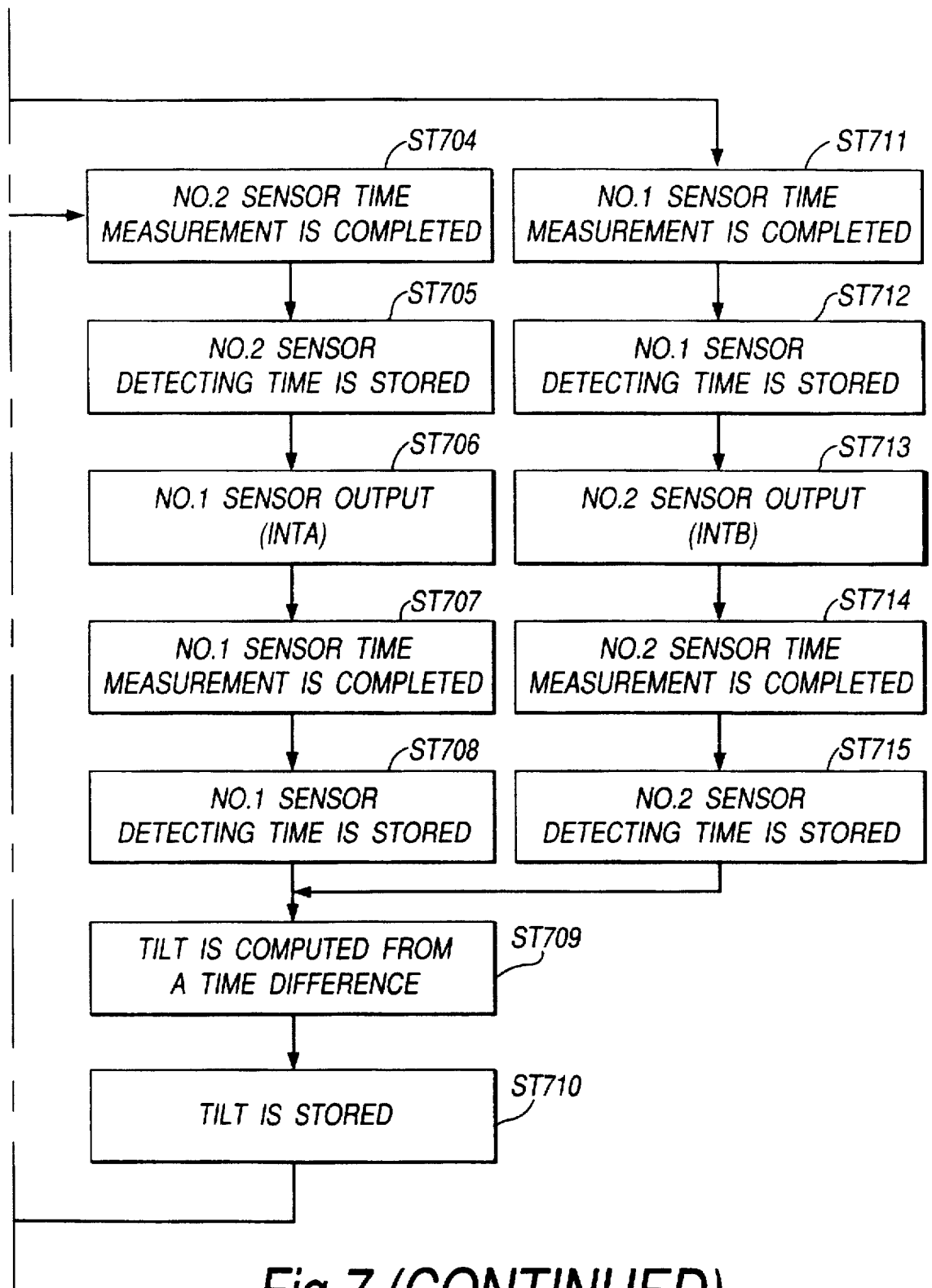

In connection with the third, second and first image forming units 30, 20 and 10, tilts of test pattern images $T_{L2}$ and $T_{R2}$, $T_{L3}$ and $T_{R3}$, and $T_{L4}$ and $T_{R4}$ against the standard values in the main scanning direction are computed, respectively according to the flowchart shown in FIG. 7.

That is, test patterns (latent images) are recorded on the photosensitive drum 11 by the imaging bar 14 and at the same time, the CPU 101 starts the time measurement (ST701) using a first and a second timers (not shown) in the CPU.

The test patterns (latent images) are developed by the developing device 14 and a developed toner image is transferred on the conveyer belt 51.

When the output of the first registration sensor 59, that is, an interrupt signal was input to the CPU 101 through the first interrupt port INTA, the CPU 101 terminates the time measurement by the first timer (not shown) and stores a measured time t1 in a built-in memory (ST702, ST711 and ST712).

Then, when the output of the second registration sensor 60, that is, an interrupt signal was input to the CPU 101 through the second interrupt port INTB, the CPU 101 terminates the time measurement by the second timer and stores a measured time t2 in the memory (ST713, ST714 and ST715).

The CPU 101 computes a tilt from a time difference of the measured times (ST709).

For instance, as t2>t1, assuming that an angle of tilt is θ, a space between the detecting locations of the first and the second registration sensors 59 and 60 is L, and a process speed (a progressing speed of the belt) is V, the tilt θ is computed according to the following expression.

$$\tan \theta = (t2 - t1) V/L$$

The CPU 101 stores this angle of tilt in the built-in memory (ST710).

Further, when the output of the second registration sensor 60, that is, an interrupt signal was input to the CPU 101 through the second interrupt port INTB, the CPU 101 terminates the time measurement by the second timer and stores the measured time t2 in the memory (ST703, ST704 and ST705).

Then, when the output of the first registration sensor 59, that is, an interrupt signal was input to the CPU 101 through the first interrupt port INTA, the CPU 101 terminates the time measurement and stores the measured time t1 in the memory (ST706, ST707 and ST708).

The CPU 101 computes a tilt from a time difference of the measured times (ST709) and stores an angle of tilt in a memory built in the CPU 101 (ST710).

Further, when the output of the first registration sensor 59, that is, an interrupt signal and the output of the second registration sensor 60, that is, an interrupt signal were input to the CPU 101 simultaneously through the first interrupt port INTA and the second interrupt port INTB, respectively, the CPU 101 judges that there is no tilt (ST716 and ST717).

The operations described above are repeated up to the imaging bar 43 of the fourth image forming unit 40 (ST718).

When completing the operations described above up to the imaging bar 43 of the fourth image forming unit 40, the CPU 101 computes image data so as to eliminate a tilt of each imaging bar (θ=0) and output a change amount to the image data control circuit 121. The image data control circuit 121 rearranges data on the built-in image data memory according to this change amount (ST719).

That is, with the first and the second registration sensors 59 and 60 arranged at both ends of the conveyer belt 51 as shown in FIG. 2, if there is a time difference when test pattern images pass through respective sensors, a tilt (the degree of parallelism) of the imaging bars can be detected by the previously described process shown in the flowchart in FIG. 7.

As described above, the tilts of the first through the fourth image forming units 10, 20, 30 and 40 are all detected and the tilts of respective image forming units against the rotary direction of the conveyer belt 51 are stored in the specified address in the memory unit 103. This tilt is converted into an image data correction amount by the CPU 101 according to a computing routine stored in the ROM 102 and stored in the NVM 104.

Here, the image data correction amount to be stored in the NVM 104 and tilts of images formed by the image forming units will be explained.

Figure 8:
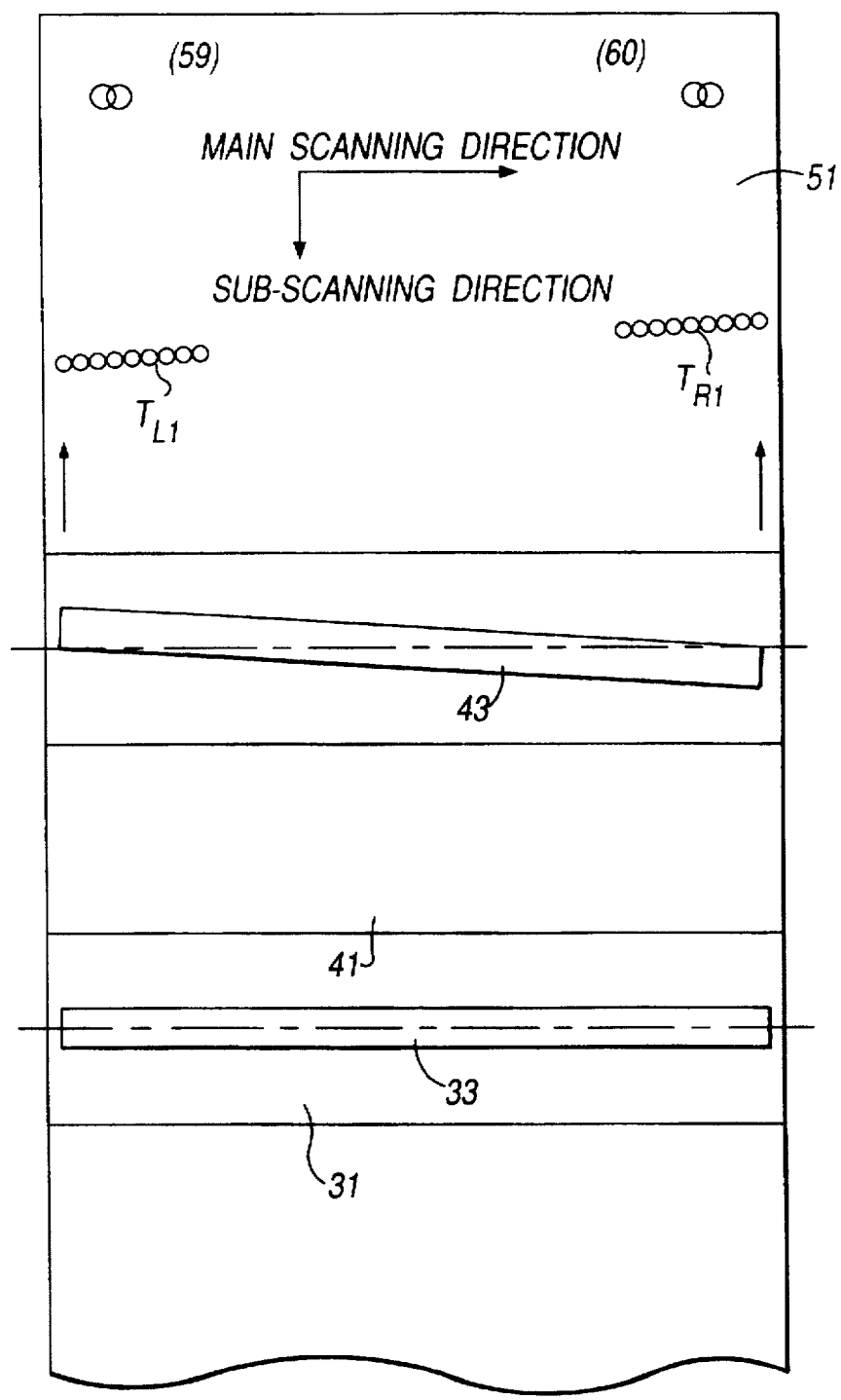
FIG. 8 is a plan view showing the principle which is able to detect the tilted misregistration according to the first embodiment shown in FIG. 2.

For instance, assuming that the imaging bar 43 of the fourth image forming unit 40 was arranged not parallel to the main scanning direction as shown in FIG. 8, the second test pattern image $T_{R1}$ transferred on the conveyer belt 51 is detected by the second registration sensor 60 before the first test pattern image $T_{L1}$.

Figure 9A:
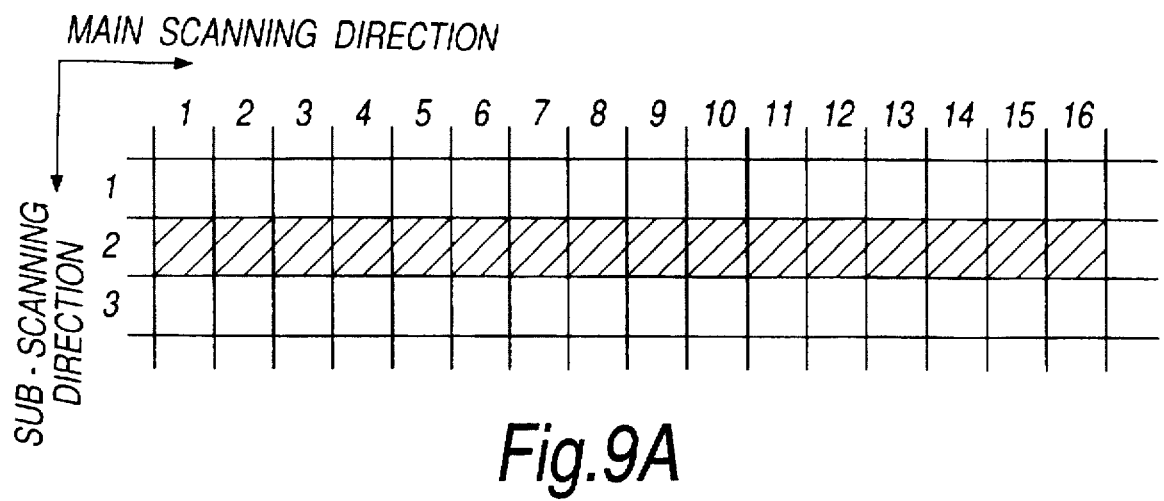
FIGS. 9A, 9B and 9C are schematic diagrams for explaining a method to rearrange image data to correct the tilted misregistration shown in FIG. 8.
Figure 9B:
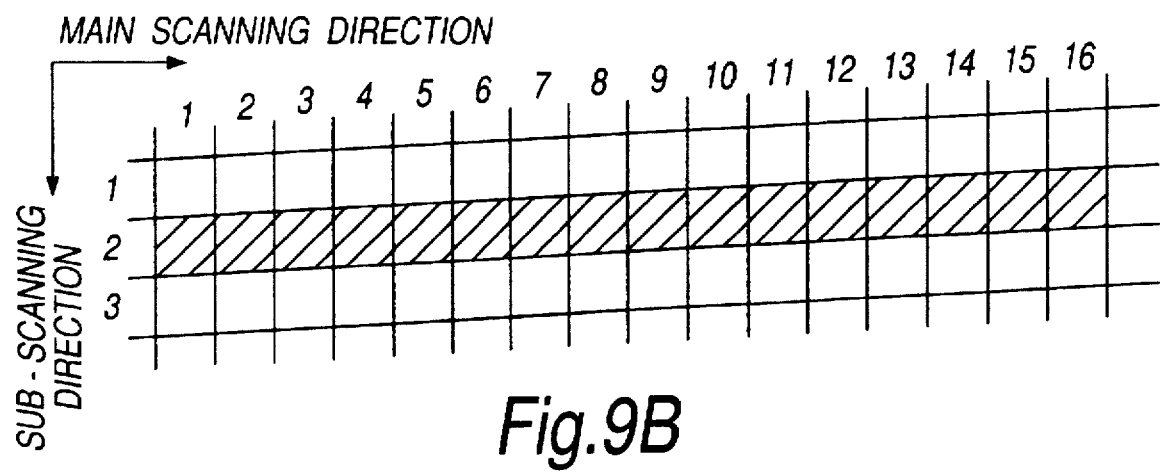

It may be regarded that, for instance, image data originally arranged parallel to the main scanning direction in a specified memory area sized 16 dots in the main scanning direction and 1 dot in the sub-scanning direction as shown in FIG. 9A were stored as if they were arranged in the tilted state as shown in FIG. 9B. The concept of the tilt of this image data is applicable to all cases where the imaging bar only is tilted, the photosensitive drum only is tilted and the image forming unit only is tilted.

Figure 9C:
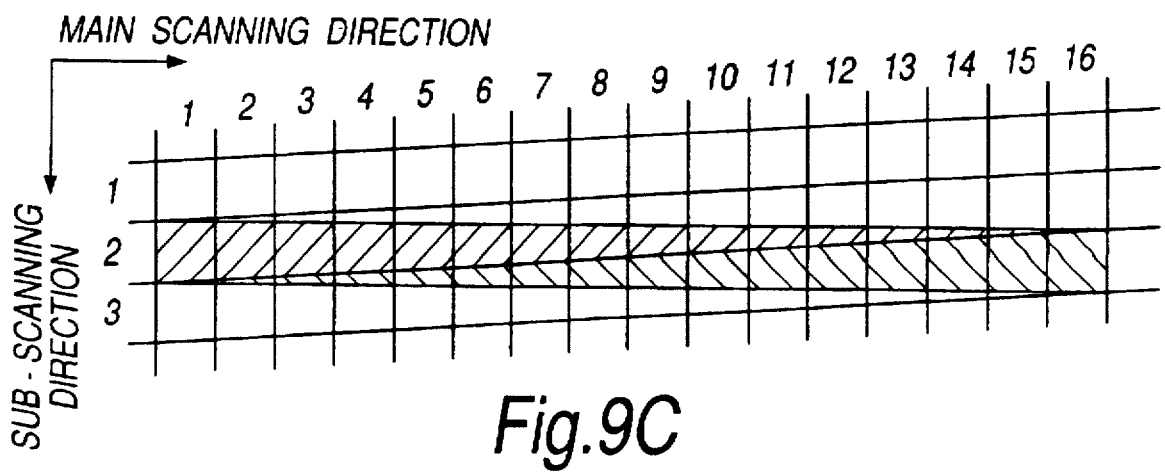

From the above, when the tilt of a test pattern image is detected according to the flowchart shown in FIG. 7, likewise the arrangement obtained by superposing a straight line which is originally expressed by a memory area less tilt on a tilted memory area in the oblique lined state as shown in FIG. 9C, images to be output to the conveyer belt 51 can be formed parallel to the main scanning direction by moving image data in the memory area in the sub-scanning direction by a specified amount in a memory storage area adapting to the detected degree of tilt.

FIGS. 10A through 10C show the imaging bar driving data for driving the imaging bars, which replaced the image data stored in the memory area shown in FIGS. 9A through 9C. That is, when a 3 lines-16 rows (16 dots) local memory is defined and a straight line in the density F at 1 through 16 rows of the second line of the memory area is recorded as shown in FIG. 9A, if there is no tilt as shown in FIG. 10A, an image parallel to the main scanning direction is formed by simply providing density information as shown in FIG. 10A. On the contrary, if the straight line is tilted by 1 dot in the sub-scanning direction at its right end as shown in FIG. 9B, it can be regarded that the imaging bar driving data also has a tilt as shown in FIGURE 10B. From this, an imaging bar driving data corresponding to image data which are shifted in a memory area are formed as shown in FIGURE 10C when density information and location information are combined. The location information u and 1 show that image data shown by specified density information are moved to the upstream side or the downstream side of an adjacent memory area in the sub-scanning direction as described later referring to FIGS. 11A and 11B.

Figure 11A:
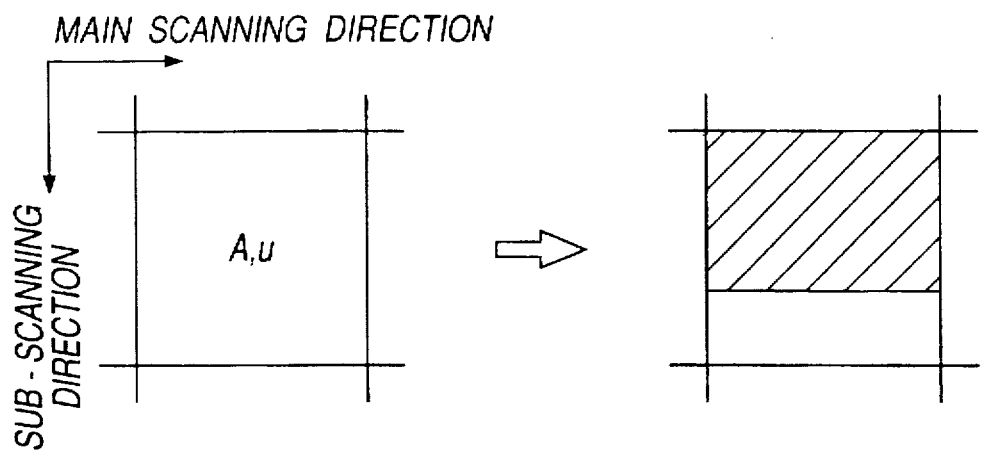
FIG. 11A and 11B are schematic diagrams showing the operations of the imaging bars corresponding to the driving data of respective imaging bars shown in FIG. 10A, 10B and 10C.
Figure 11B:
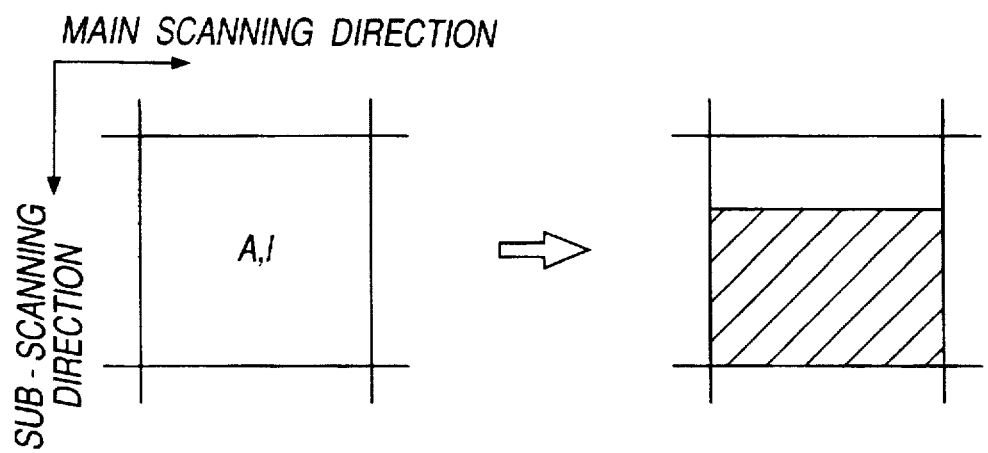

Shown in FIGS. 11A and 11B are typical diagrams showing the relationship between the light emitting state (the light emitting time) of the light emitting elements of the imaging bars 13, 23, 33 and 43 incorporated in the first through the fourth image forming units and the imaging bar driving data shown in FIG. 10C.

In FIGS. 11A and 11B, the light emitting state of the imaging bar corresponding to the imaging bar driving data for 1 dot in the memory area is shown.

As explained in the above, the density information shows the light emitting times of 16 steps shown by 0, 1, . . . 9, A . . . E and F and, for instance, "A" shows that the light emitting time is 11/16. Further, the location information shows 2 types of operations shown by u and 1 and "u" shows the light emissions continuous at the upstream side of memory areas continuous in the sub-scanning direction and "1" shows the light emissions continuous at the downstream side of memory areas which are continuous in the sub-scanning direction.

From the above, if the imaging bar driving data supplied to some light source of the imaging bar are "A, u", the light is emitted for a length "A" continuously to the upstream side of the continuous memory areas as shown in FIG. 11A. If the imaging bar driving data are "A, 1", the light is emitted for a length "A" continuously to the downstream side of the continuous memory areas as shown in FIGURE 11B.

Shown in FIGS. 12A and 12B are typical diagrams showing the imaging bar driving data shown in FIGS. 10A through 10C deformed to correspond to the actual exposing length in the main scanning direction. That is, if the number of light sources of the imaging bars in the main scanning direction is "n", as image data having 1 dot width in the sub-scanning direction recorded in the memory area are shown as in FIG. 12A, the density information and the shift amount of the location information depending on the tilt are proportionally distributed based on the number of dots "n" in the main scanning direction and thus, the tilt in the main scanning direction is eliminated.

Secondly, in connection with the sub-scanning misregistration shown in FIG. 4A, deviations between the imaging bars of the image forming units and the mounting positions of the corresponding photosensitive drums or deviations of spaces among the image forming units are detected. The misregistration in the sub-scanning direction will be explained hereinafter taking the state where the misregistration of tilt was removed as explained referring to FIGS. 7 through 12B as an example. As the misregistration of tilt was already eliminated, it is possible to detect the sub-scanning misregistration by a test pattern image at either side and the corresponding registration sensor and so, hereinafter, the first registration sensor 59 will be explained as a representative sensor.

Figure 14:
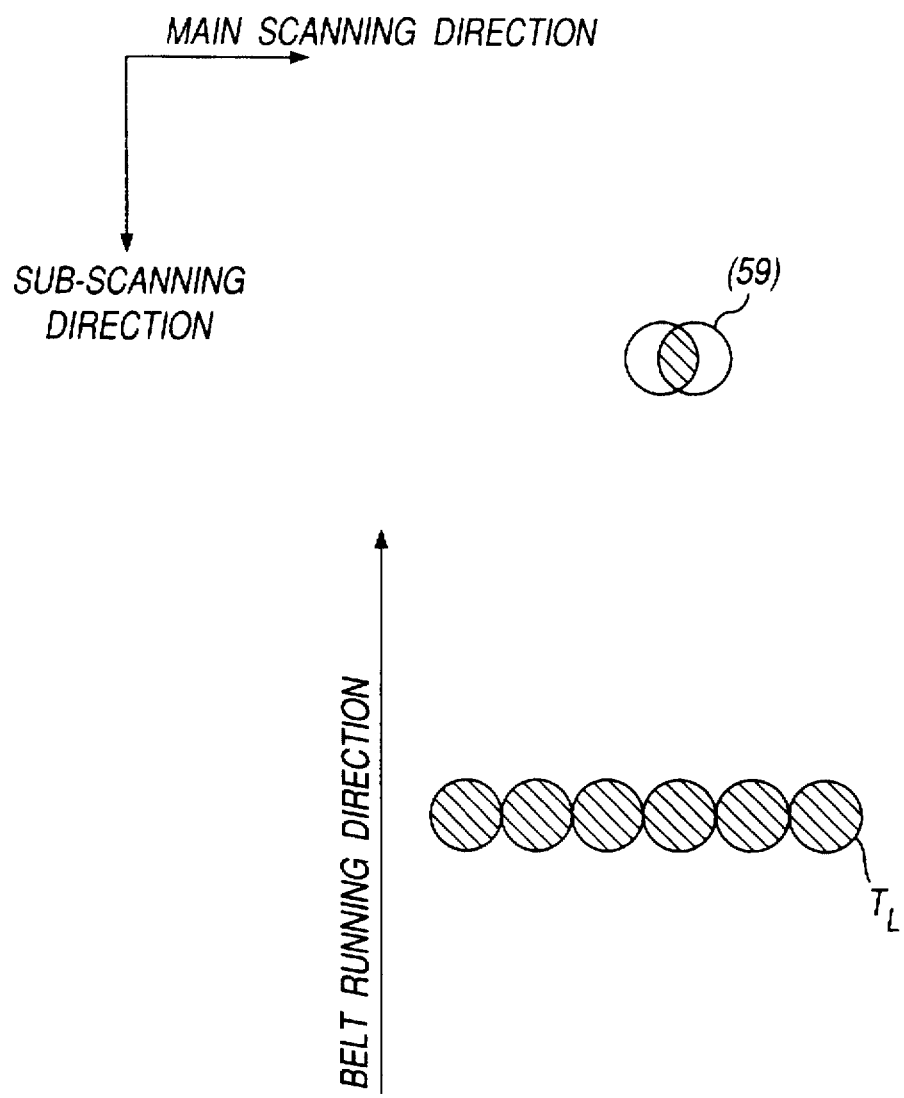
FIG. 14 is a plan view showing the principle that is able to detect the sub-scanning misregistration according to the first embodiment shown in FIG. 2.

FIG. 14 is a schematic diagram showing the relationship of position between a test pattern image $T_L$ comprising a plurality of dot patterns formed and lined up by one of the first through the fourth image forming units 10, 20, 30 and 40 and the first registration sensor 59.

The test pattern image TL transferred on the conveyer belt 51 is guided to the detecting region opposite to the first registration sensor 59 with the movement of the conveyer belt 51 in the same manner as the detecting of the tilted misregistration as explained in the above using FIGS. 7 through 12. The test pattern image $T_L$ conveyed by the conveyer belt 51 passes through the detecting region by the first optical fiber 59b and the second optical fiber 59c of the first registration sensor 59. During this passage, the reflecting light from the conveyer belt 51 and the test pattern image $T_L$ taken out by the second optical fiber 59c is converted photoelectrically by the optical sensor 59d and input to the non-inverted input terminal of the first comparator 111. The output from the CPU 101 for defining the threshold level is converted to an analog signal through the D/A converter 113 and input to the inverted input terminal of the first comparator 111. Here, it is assumed that a time from when the first test pattern image is formed by the imaging bar 13 of the first image forming unit 10 until it passes through the first registration sensor 59 is T1 second.

In succession, the second test pattern image (not shown) comprising a plurality of dot patterns lined up in the sub-scanning direction is formed by the second image forming unit 20 in the same manner as above. Further, the third and the fourth test pattern images comprising a plurality of dot patterns lined up in the sub-scanning direction are formed in order.

Figure 15:
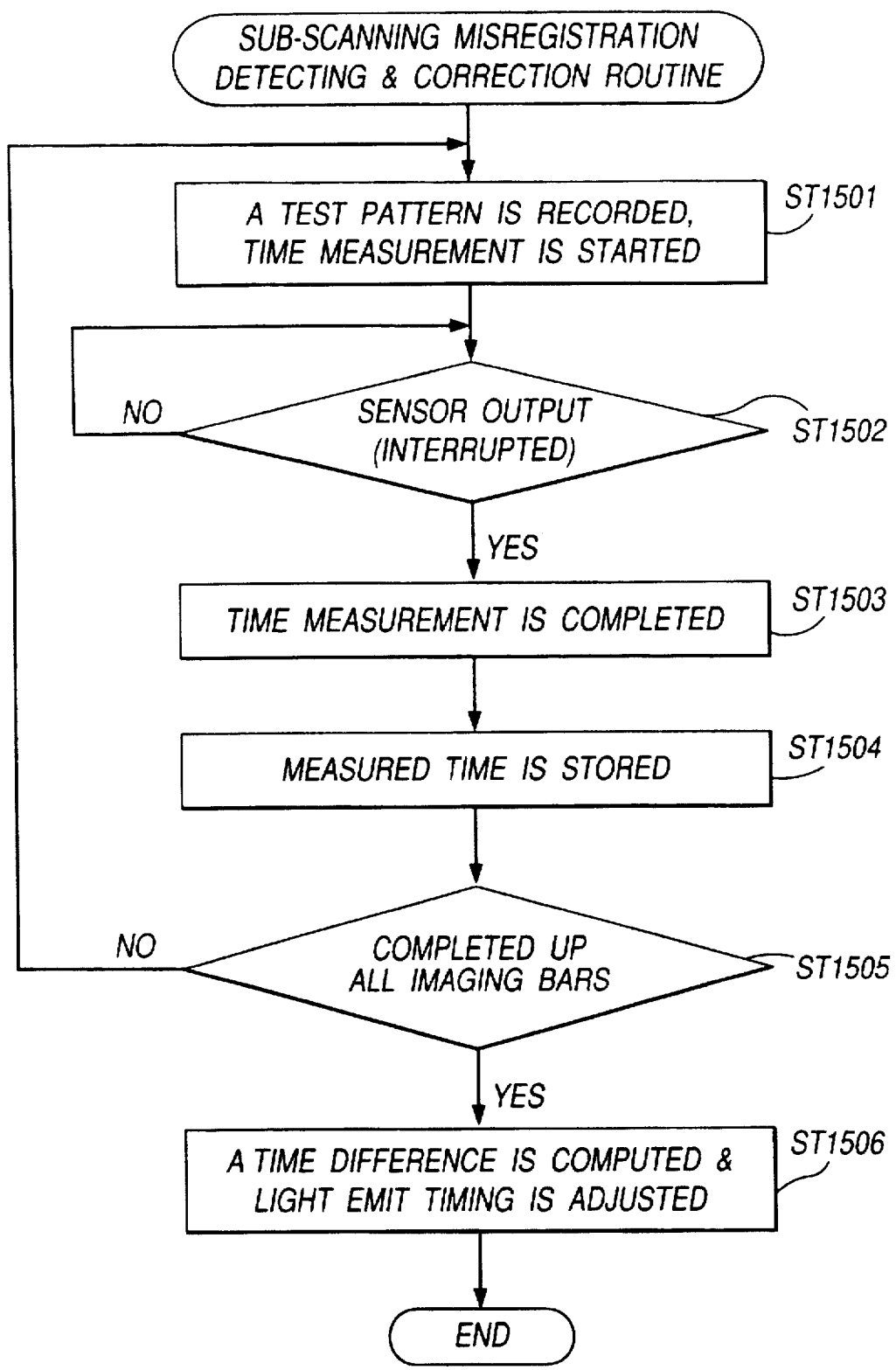
FIG. 15 is a flowchart showing an example of the operation for defining the light emitting timing of the imaging bar by detecting the sub-scanning misregistration using the first embodiment shown in FIG. 2.

Here, after forming the second through the fourth test pattern images by the second, the third and the fourth image forming units 20, 30 and 40, a time for each test pattern image to pass through the first registration sensor 59 is computed in order according to the flowchart shown in FIG. 15.

Figure 16:
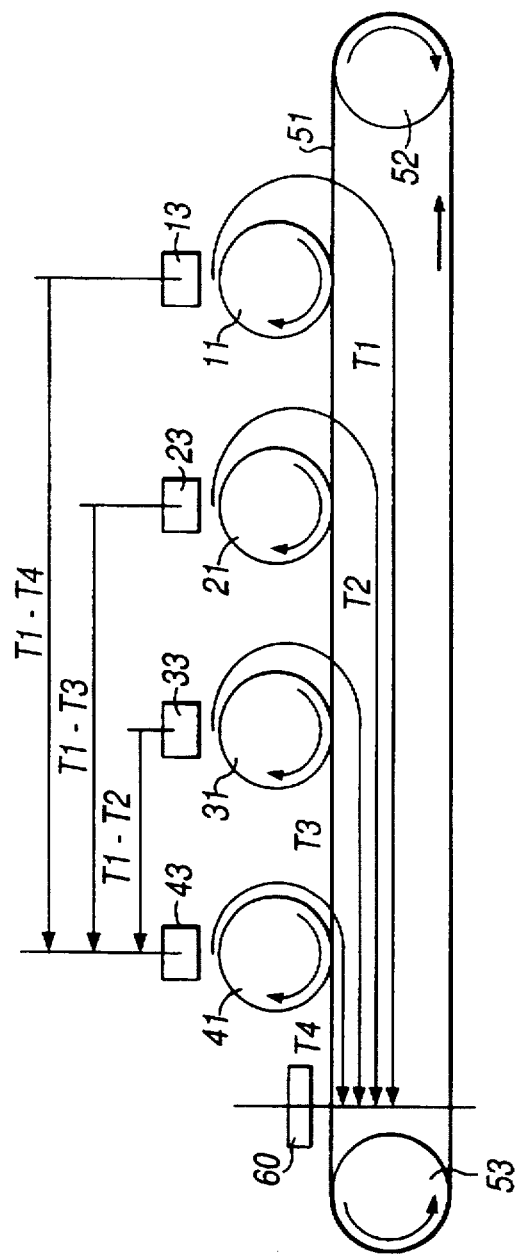
FIG. 16 is a schematic diagram for explaining the light emitting timing shown in FIG. 15.

At this time, as the second through the fourth test pattern images formed on the conveyer belt 51 by the second through the fourth image forming units pass through the first registration sensor 59 after T2, T3 and T4 seconds, timings for actually exposing the test pattern images on the photosensitive drums 21, 31 and 41 of the second through the fourth image forming units 20, 30 and 40 are defined to be T1–T2, T1–T3 and T1–T4 seconds, respectively based on the exposure start timing to the first image forming unit 10 as shown in FIG. 16.

That is, as shown in the flowchart in FIG. 15, a test pattern (a latent image) is formed on the photosensitive drum 11 by the imaging bar 13 of the first image forming unit 10. At the same time, the CPU 101 starts the time measurement using a built-in timer (not shown) in the CPU 101 (ST1501). This test pattern (a latent image) is developed by the developing device 14 and transferred on the conveyer belt 51, and this developed test pattern image is conveyed. When detecting the test pattern image transferred on the conveyer belt 51, the first registration sensor 59 outputs the sensor output and inputs this sensor output signal into the CPU 101 through the first interrupt port INTA as an interrupt signal (ST1502).

When receiving the interrupt signal, the CPU 101 terminates the time measurement by the built-in timer (ST1503).

The CPU 101 stores the measured time T1 by the timer in a built-in memory (not shown) in the CPU 101 (ST1504).

These steps ST1501 through ST1504 are repeated up to the imaging bar 43 of the last fourth image forming unit 40. The measured times T1, T2, T3 and T4 are stored in the memory built in the CPU 101 (ST1505).

The CPU 101 computes T1–T2, T1–T3 and T1–T4 and based on the light emitting timing of the imaging bar 13 of the first image forming unit 10, sets the light emitting timing for the image forming from the next time at after |T1–T2| for the imaging bar 23 of the second image forming unit 20, after |T1–T3| for the imaging bar 33 of the third image forming unit 30 and after |T1–T4| for the imaging bar 43 of the fourth image forming unit (ST1506)

That is, when actually forming an image, it becomes possible to bring the top lines of respective colors to agree with each other by setting the exposure start timing after the second color at a time passed from the exposure start of the first color by T1–T2, T1–T3 and T1–T4 seconds, respectively. That is, it is possible to correct the misregistration in the sub-scanning direction.

The exposure start timings of the first through the fourth image forming units 10, 20, 30 and 40 relative to the sub-scanning direction thus obtained are stored in the NVM 104 via the CPU 101.

Thirdly, in connection with the main scanning misregistration shown in FIG. 4B, a deviation between the imaging bars of the image forming units and the mounting locations of corresponding photosensitive drums or a deviation of a space between the image forming units is detected. The image misregistration in the main scanning direction will be explained in the following taking the state with the misregistration of tilt explained using FIGS. 7 through 12B and the image misregistration in the sub-scanning direction described in the above referring FIGS. 14 through 16 removed, respectively as an example.

Figure 17:
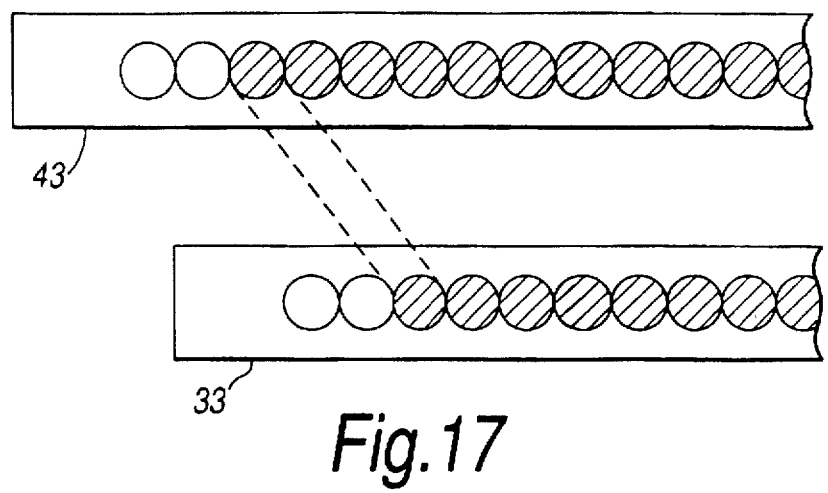
FIG. 17 is a plan view showing the principle that is able to detect the main scanning misregistration according to the first embodiment shown in FIG. 2.

The image misregistration in the main scanning direction is considered to be caused when the light sources of the imaging bars 13, 23, 33 and 43 of the first through the fourth image forming units are mutually or at least one of them is deviated in the main scanning direction as shown in FIG. 17. Further, this concept of image data deviation in the main scanning direction is applicable to any one of cases where the imaging bars only are misregistrationed in parallel with the main scanning direction, the entire image forming units are misregistrationed in parallel with the main scanning direction and both of these cases are produced simultaneously.

Figure 18A:
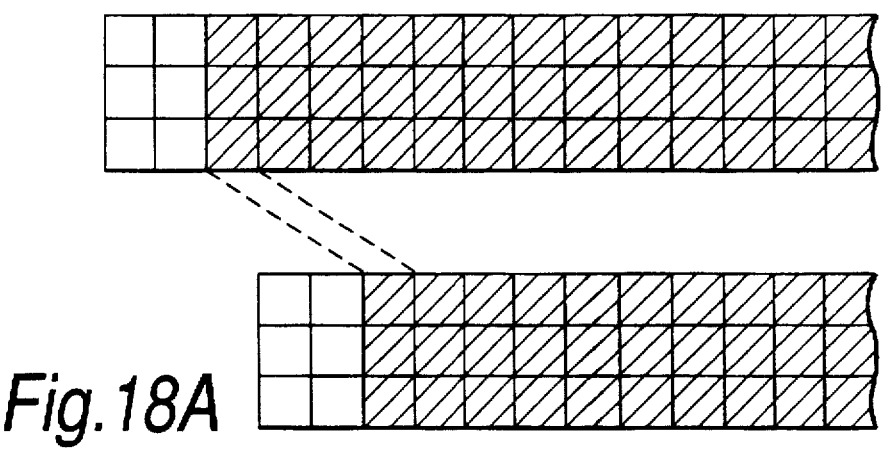
FIGS. 18A ad 18B are schematic diagrams for explaining a method to rearrange image data for correcting main scanning misregistration shown in FIG. 17.
Figure 18B:
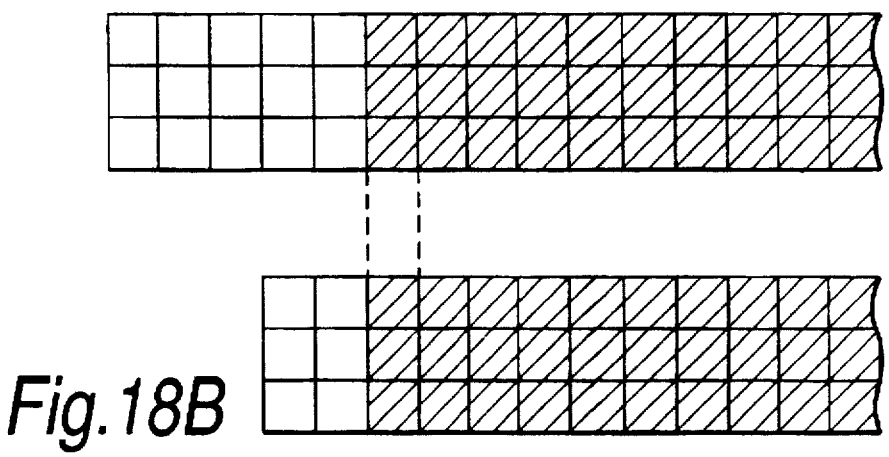

This image misregistration in the main scanning direction may be regarded as such image data were stored, for instance, as if the entire memory area was arranged in the state where it was moved in parallel with the main scanning direction although image data were stored in the specified sized memory area at the same location as shown in FIG. 18A. From this, the misregistration in the main scanning direction can be easily removed by shifting a region of a memory area, in which image data are stored, corresponding to the detected deviation as shown in FIG. 18B.

Figure 19:
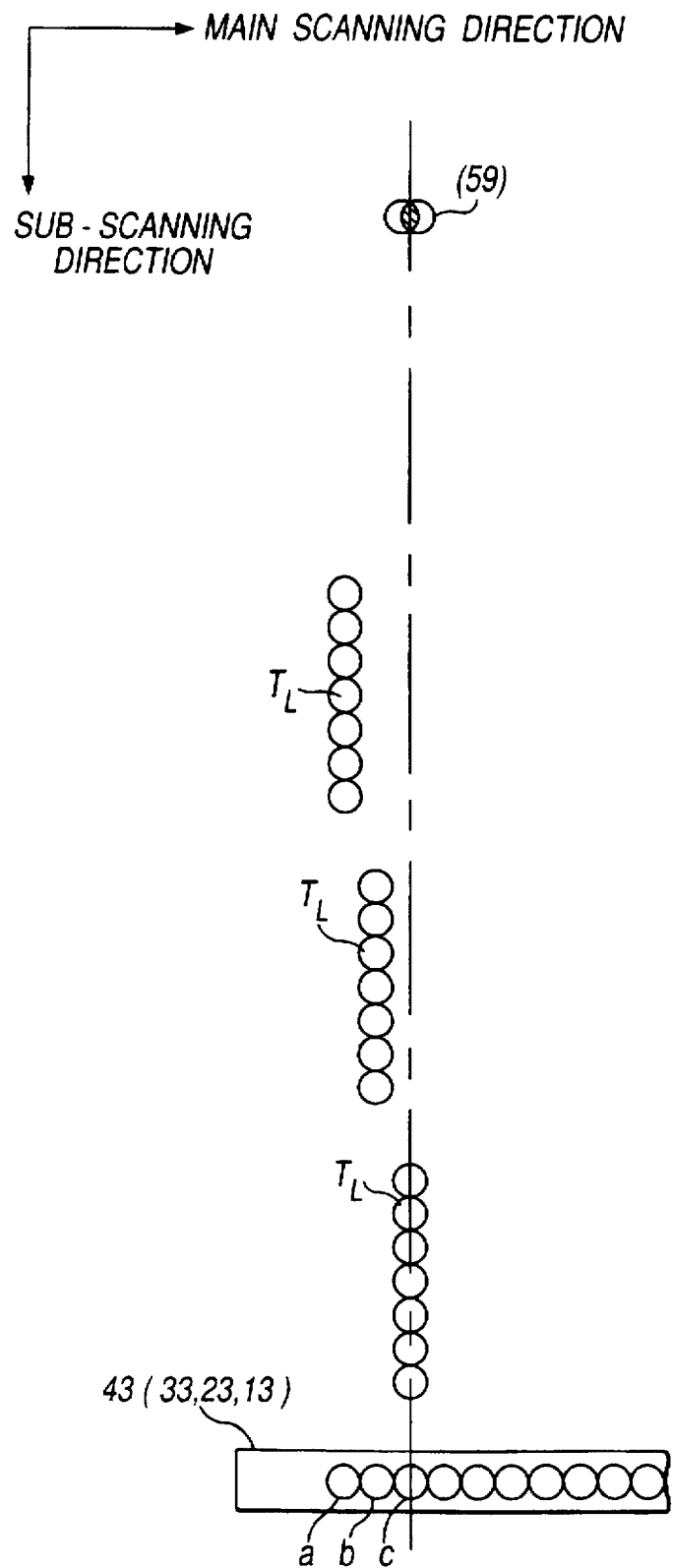
FIG. 19 is a plan view showing the principle that is able to detect main scanning misregistration according to the first embodiment shown in FIG. 2.

In detail, as shown in FIG. 19, a test pattern image $T_L$ formed in the order of, for instance, the first row (a light source a), the second row (a light source b), the third row (a light source c), . . . is guided to a detecting region opposite to the first registration sensor 59 with the moving of the conveyer belt 51 by one of the first through the fourth imaging bars 13, 23, 33 and 43 (here, the imaging bar 43 of the fourth image forming unit 40 is used as a representative). Here, the test pattern image $T_L$ of a row corresponding to any light source conveyed by the conveyer belt 51 passes through the detecting region comprising the first optical fiber 59b and the second optical fiber 59c of the first registration sensor 59 when it is brought to agree with the detecting region of the first registration sensor 59. When passing through this detecting region, the reflecting light from the conveyer belt 51 taken by the second optical fiber 59c is converted photoelectrically by the optical sensor 59d and input to the non-inverted input terminal of the first comparator 111.

Figure 20:
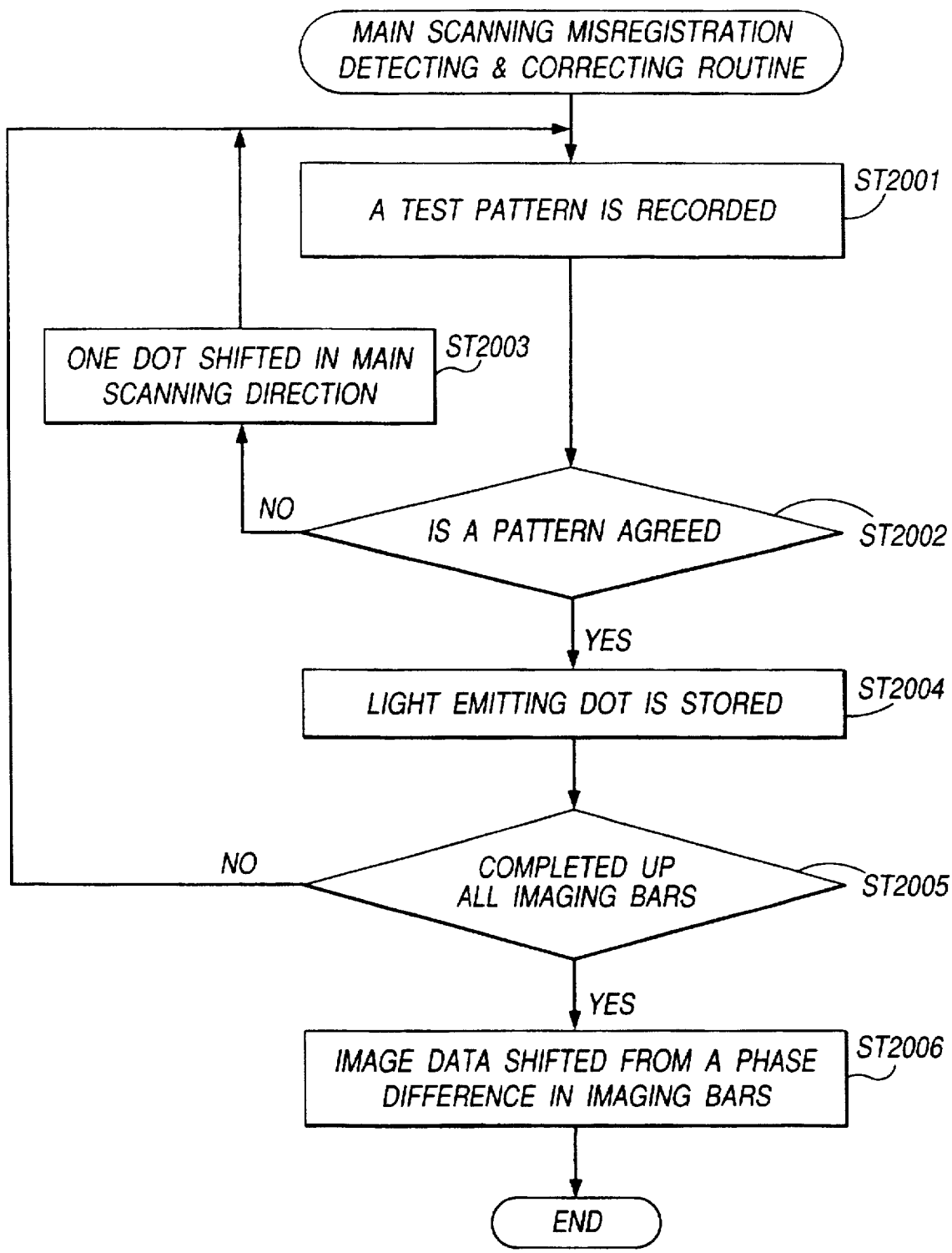
FIG. 20 is a flowchart showing an example of the operation for defining the light emitting timing of the imaging bar by detecting sub-scanning misregistration using the first embodiment shown in FIG. 2.

Hereinafter, test pattern images are formed in order by the third, the second and the first image forming units 30, 20 and 10 according to the flowchart shown in FIG. 20, the misregistration of the write start position in the main scanning direction, that is, a phase difference is computed and further, a correction amount is defined.

That is, a test pattern (a latent image) is formed on the photosensitive drum 11 by the imaging bar 13 of the first image forming unit 10. This test pattern is formed by the first dot of the imaging bar 13. The test pattern (the latent image) is developed by the developing device 14 and the developed toner image is transferred on the conveyer belt 51.

If the test pattern comprising the toner image transferred on the conveyer belt 51 is not detected by the first registration sensor 59, the CPU 101 forms the test pattern by the second dot of the imaging bar 13 (by shifting one dot in the main scanning direction) and repeats the step ST2001 (ST2002 and ST2003).

Further, when detecting the test pattern, the first registration sensor 59 outputs the sensor output and inputs this sensor output as an interrupt signal to the CPU 101 through the first interrupt port INTA (ST2002).

When receiving the interrupt signal, the CPU 101 stores the luminous dots which formed the detected test pattern in the memory unit 103 (ST2004).

The steps ST2001 through ST2004 are repeated up to the imaging bar 43 of the fourth image forming unit 40. The luminous dots of respective imaging bars which formed the test pattern detected by the first registration sensor 59 are stored in the memory unit 103 (ST2005).

The CPU 101 transmits an image data change amount (that is, a phase difference) to the image data control circuit 121. The image data control circuit 121 shifts image data on the memory unit 103 according to the received image data change amount (ST2006).

As explained above, according to the first embodiment shown in FIGS. 1 through 20, various factors causing misregistrations of color images attributable to the misregistration and tilt of position among the first through the fourth image forming units 10, 20, 30 and 40, the tilt and eccentricity of the photosensitive drums in respective image forming units and the tilt of the imaging bars in respective image forming units can be surely removed by the first and the second registration sensors 59 and 60 arranged with a specified distance in the main scanning direction.

Figure 21:
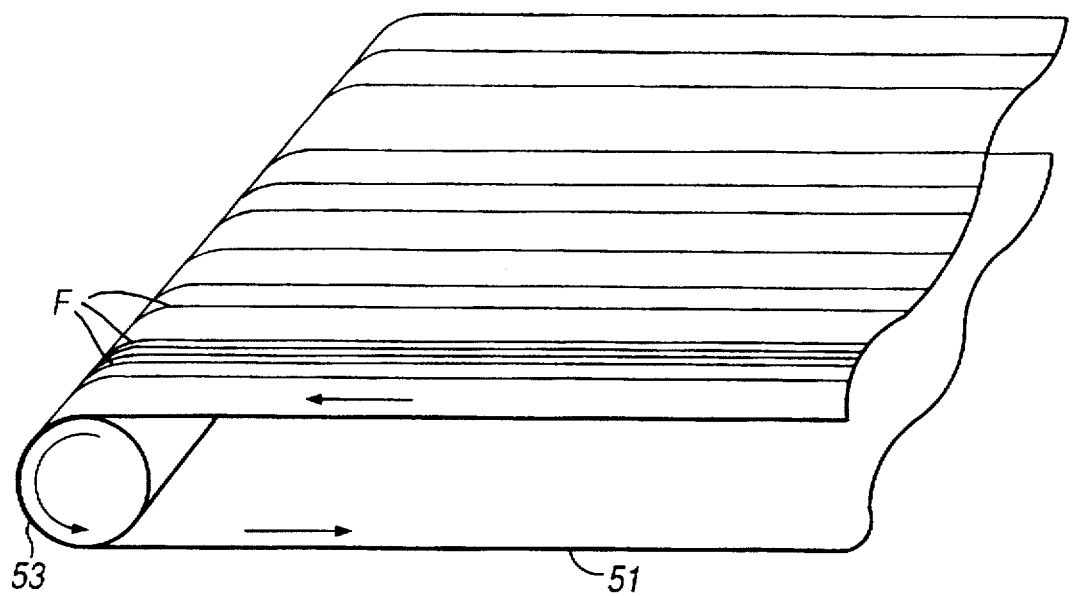
FIG. 21 is a schematic diagram showing an example of flaws produced on a conveyer belt used in the image forming apparatus shown in FIG. 1.

As shown in FIG. 21, many scratches F may be produced on the conveyer belt 51 along the sub-scanning direction, that is, the moving direction of the conveyer belt 51 when a paper P passes.

Figure 22:
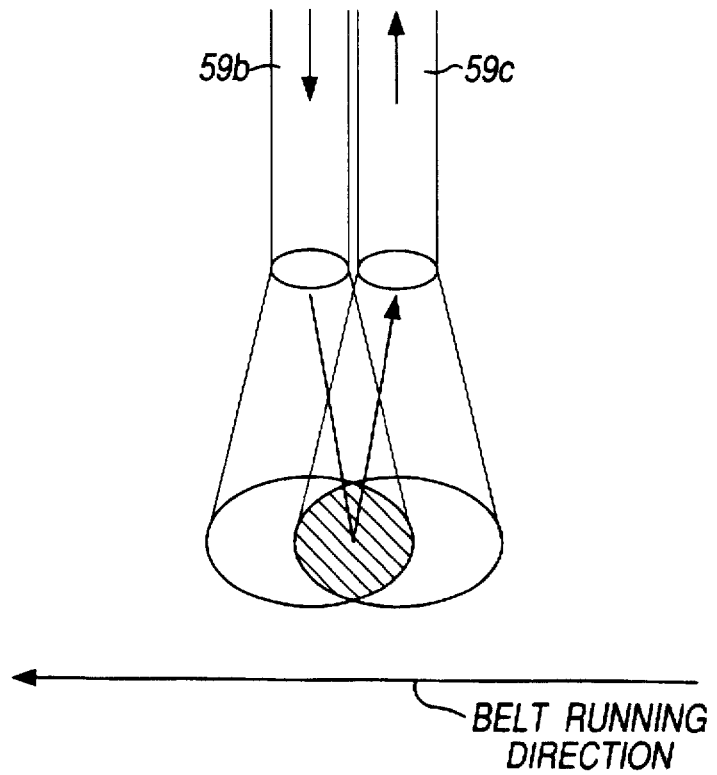
FIG. 22 is a schematic diagram showing a deformed example of a registration sensor of the misregistration detecting mechanism shown in FIG. 2.

From this, as shown in FIG. 22, undesired change of a size of detecting signal detected by the second optical fiber caused by the change in reflection factor due to scratches F on the conveyer belt 51 is prevented when the direction of scratches F on the conveyer belt 51, the directions of the first and the second optical fibers of the first and the second registration sensor 59 and 60 and the moving direction of the conveyer belt 51 are specified to the parallel direction.

Figure 23:
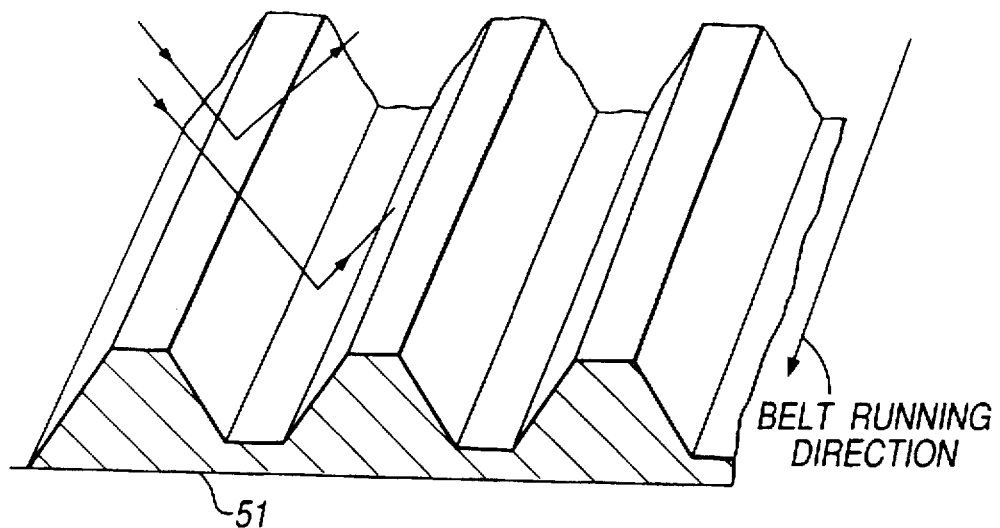
FIG. 23 is a schematic diagram showing the relationship between the direction of the light applied from the registration sensor to flaws on the conveyer belt shown in FIG. 21 and the direction of the light reflecting on the conveyer belt.
Figure 24:
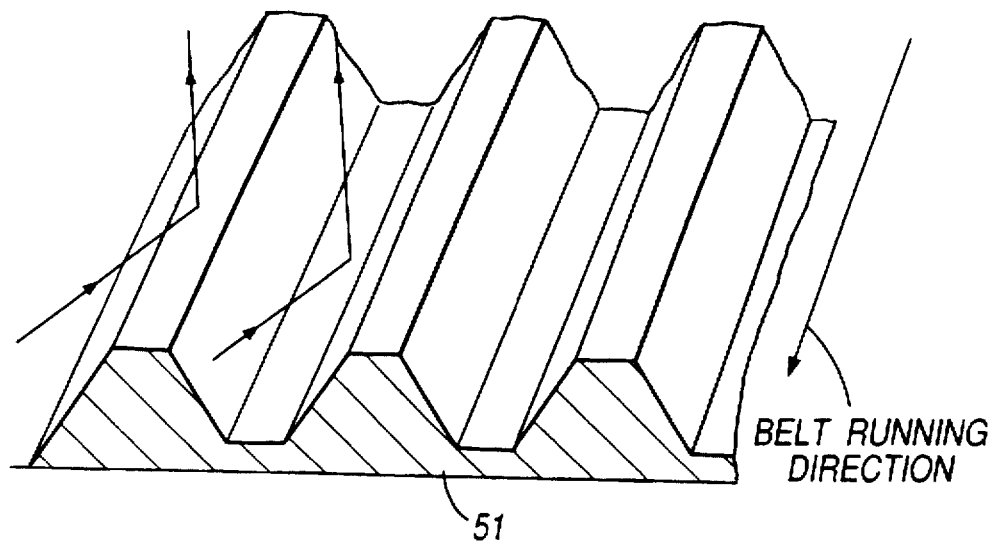
FIG. 24 is a schematic diagram showing the relationship between the direction of the light applied from the registration sensor to flaws on the conveyer belt shown in FIG. 21 and the direction of the light reflected on the conveyer belt.

FIGS. 23 and 24 are partial cross-sectional views for explaining the relationship between the direction in which the illuminating light is applied to the conveyer belt 51 by the first optical fiber of the registration sensor and the moving direction of the conveyer belt 51.

As shown in FIG. 23, likewise the first embodiment already explained in FIG. 5, if the illuminating light is applied along the moving direction of the conveyer belt 51, that is, the main scanning direction orthogonal to the sub-scanning direction, the reflecting direction of the light reflected on the conveyer belt 51 may largely change due to the depth of scratch F on the conveyer belt 51.

On the other hand, as shown in FIG. 24, when the illuminating light is applied from the moving direction of the conveyer belt 51, that is, the sub-scanning direction, the reflecting direction of the light reflected on the conveyer belt 51 can be maintained nearly constant.

When the first and the second optical fibers of the registration sensor are lined up in the sub-scanning direction, it becomes possible to stabilize the signal detected by the second optical fiber.

Figure 25A:
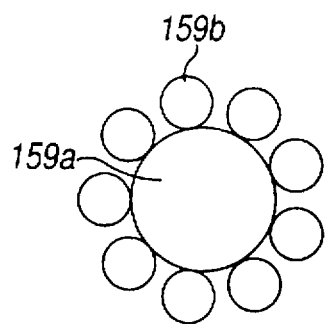
FIGS. 25A and 25B are schematic diagrams showing a second embodiment of the misregistration detecting mechanism.
Figure 25B:
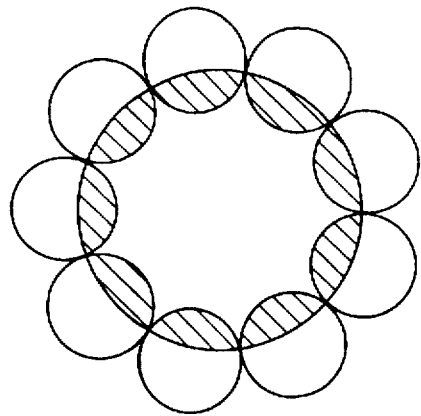

FIGS. 25A and 25B show a second embodiment of the registration sensor. As two sets of the substantially same registration sensors are arranged with a space in the main scanning direction, the second embodiment will be explained using one set of sensors as a representative.

In the second embodiment shown in FIG. 25A, there are provided a plurality of second optical fibers 159b which take in the reflecting light from the conveyer belt and guide to an optical sensor (not shown) around a first optical fiber 159a which guides the light from a light source (not shown) to a specified location on the conveyer belt.. The first and the second optical fibers 159a and 159b are arranged vertically to the surface of the conveyer belt, respectively. Now, a region wherein the conveyer belt is illuminated by the group of optical fibers shown in FIG. 25A will be considered. The light applied to the conveyer belt by the first optical fiber 159a is diffused in a uniform extent on the conveyer belt. Further, the reflecting light from the conveyer belt is almost uniformly applied to the second optical fibers 159b surrounding the first optical fiber 159a. Therefore, it is possible to detect a test pattern image stably without increasing mounting accuracy of respective optical fibers unnecessarily.

That is, according to the arranging method of the first and the second optical fibers shown in FIG. 25A, the detecting output is maintained constant even when the mounting directions of the first and the second optical fibers are changed.

Figure 26A:
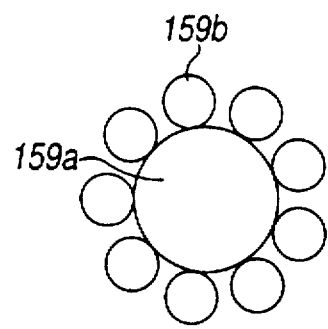
FIGS. 26A and 26B are schematic diagrams showing deformed examples of the misregistration detecting mechanism shown in FIGS. 25A and 25B.

FIG. 26A shows a deformed example of the registration sensors shown in FIG. 25A.

Figure 26B:
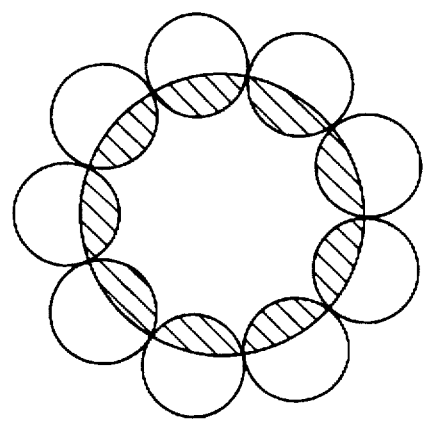

In the deformed example shown in FIG. 26A, around the second optical fiber 159b which takes in the reflecting light from the conveyer belt and guides it to an optical sensor (not shown), there are arranged a plurality of first optical fibers 159a which guide the light from a light source (not shown) to a specified location on the conveyer belt. In this example, as the surroundings of the second optical fiber 159b are illuminated, the reflected light from the conveyer belt by the light applied to the conveyer belt by the first optical fibers 159a is surely applied to the second optical fiber 159b as shown in FIG. 26B. In this case, the quantity of reflected light detected is more stabilized when compared with the arrangement of the optical fibers shown in FIG. 25A.

FIG. 27 shows a third embodiment of the registration sensor. As two sets of substantially the same registration sensors are provided with a space in the main scanning direction, the third embodiment will be explained here using one set of sensors as a representative.

The registration sensors shown in FIG. 27 are arranged in at least 2 sets comprising the first optical fiber 59b and the second optical fiber 59c in the main scanning direction. The first optical fiber 59b which guides the light from a light source (not shown) to the conveyer belt and the second optical fiber 59c which guides the reflecting light from the conveyer belt to an optical sensor (not shown) are provided alternately.

FIG. 28A is a schematic diagram showing a characteristic of the detecting signal which is output from the registration sensor shown in FIG. 27. FIG. 28A shows the detecting output from the registration sensor and FIG. 28B shows the detecting output of the registration sensor shown in FIG. 5 for the purpose of comparison.

When FIG. 28A is compared with FIG. 28B, the detecting output of the registration sensor when detecting a test pattern image $T_L$ and the surface of the conveyer belt increases almost proportionally to the number of sets of the first and the second optical fibers. Accordingly, only when a space sufficiently enough for installing 2 or 5 sets of fibers is secured, it becomes possible to detect a test pattern image stably.

Figure 29:
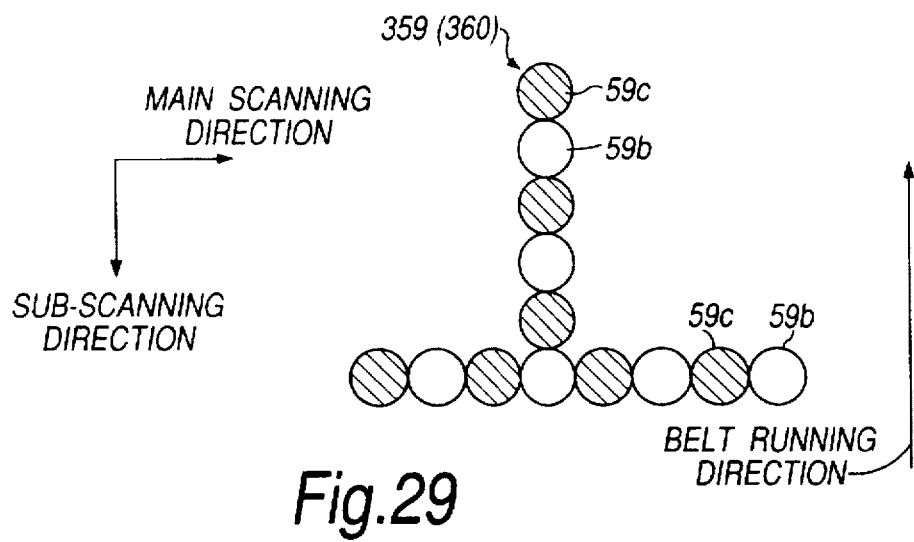
FIG. 29 is a schematic diagram showing a fourth embodiment of the misregistration detecting mechanism.

FIG. 29 shows a fourth embodiment of the registration sensor. As two sets of the substantially same registration sensors are provide with a space in the main scanning direction, the fourth embodiment will be explained here using one set of the registration sensors as a representative.

The registration sensors shown in FIG. 29 are arranged in 4 sets comprising the first and the second optical fibers 59b and 59c in the main scanning direction and 3 sets in the sub-scanning direction. The first optical fiber 59b which guides the light from a light source (not shown) and the second optical fiber 59c which guides the reflecting light from the conveyer belt to an optical sensor (not shown) are arranged alternately.

Figure 30A:
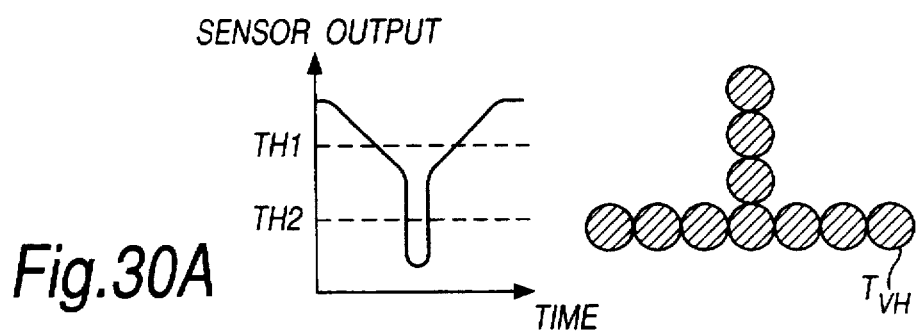
FIG. 30A, 30B and 30C are schematic diagrams showing examples of outputs obtained by the misregistration detecting mechanism shown in FIG. 29.
Figure 30B:
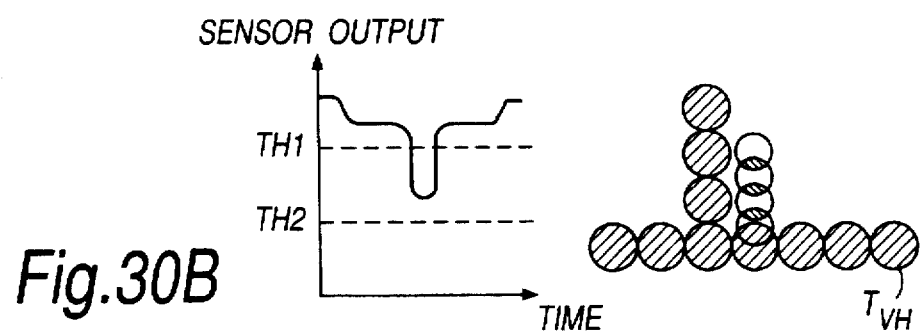
Figure 30C:
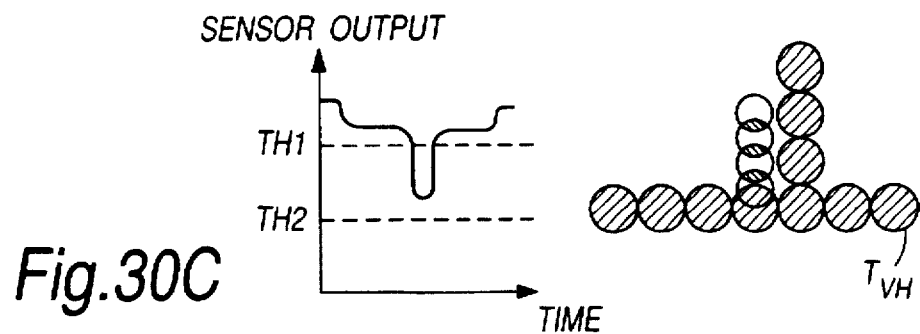
Figure 31:
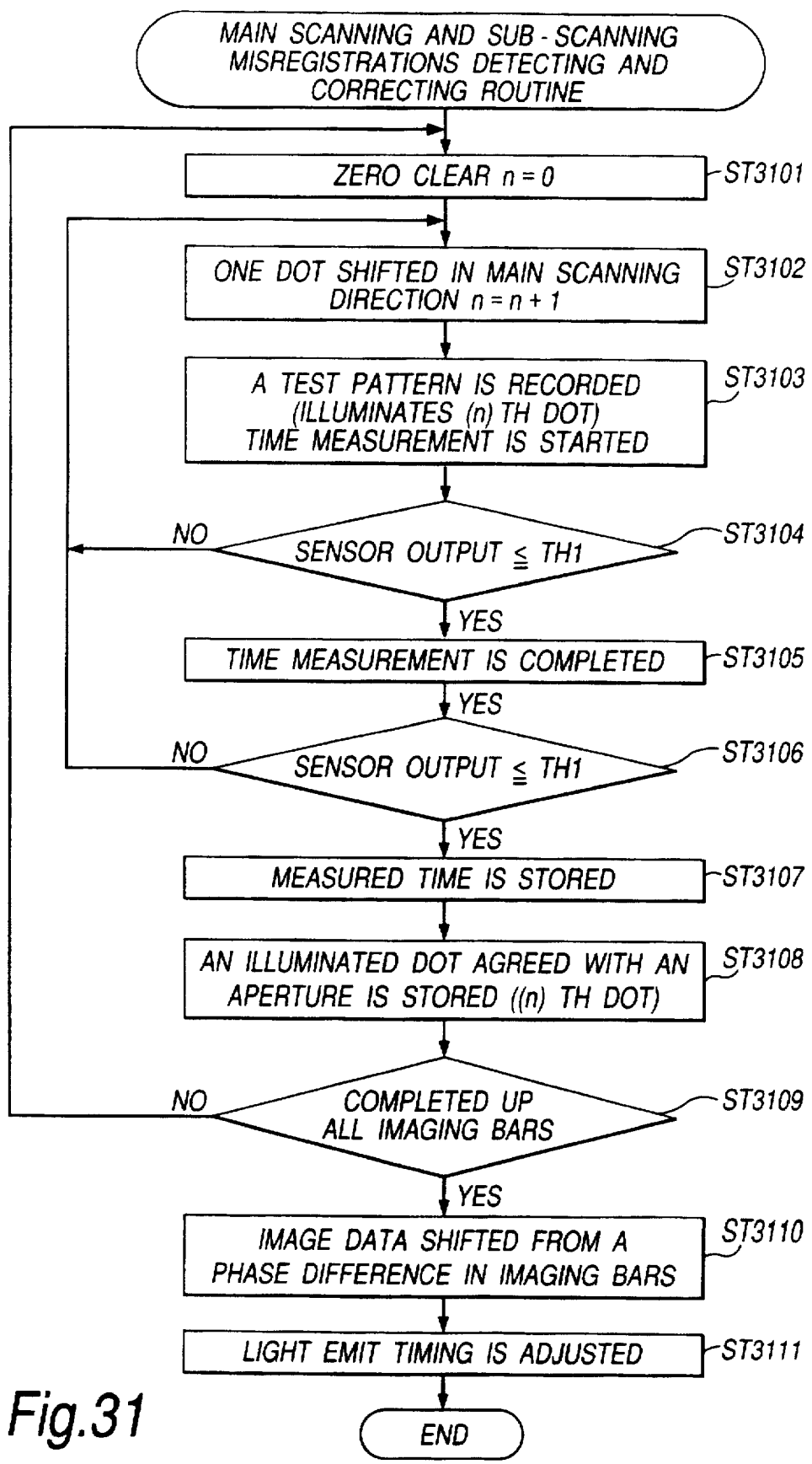
FIG. 31 is a flowchart showing an example of the operation for defining the exposure timing and the exposure start location of the imaging bar by detecting the sub and main scanning misregistrations by the misregistration detecting mechanism shown in FIG. 27.
Figure 32:
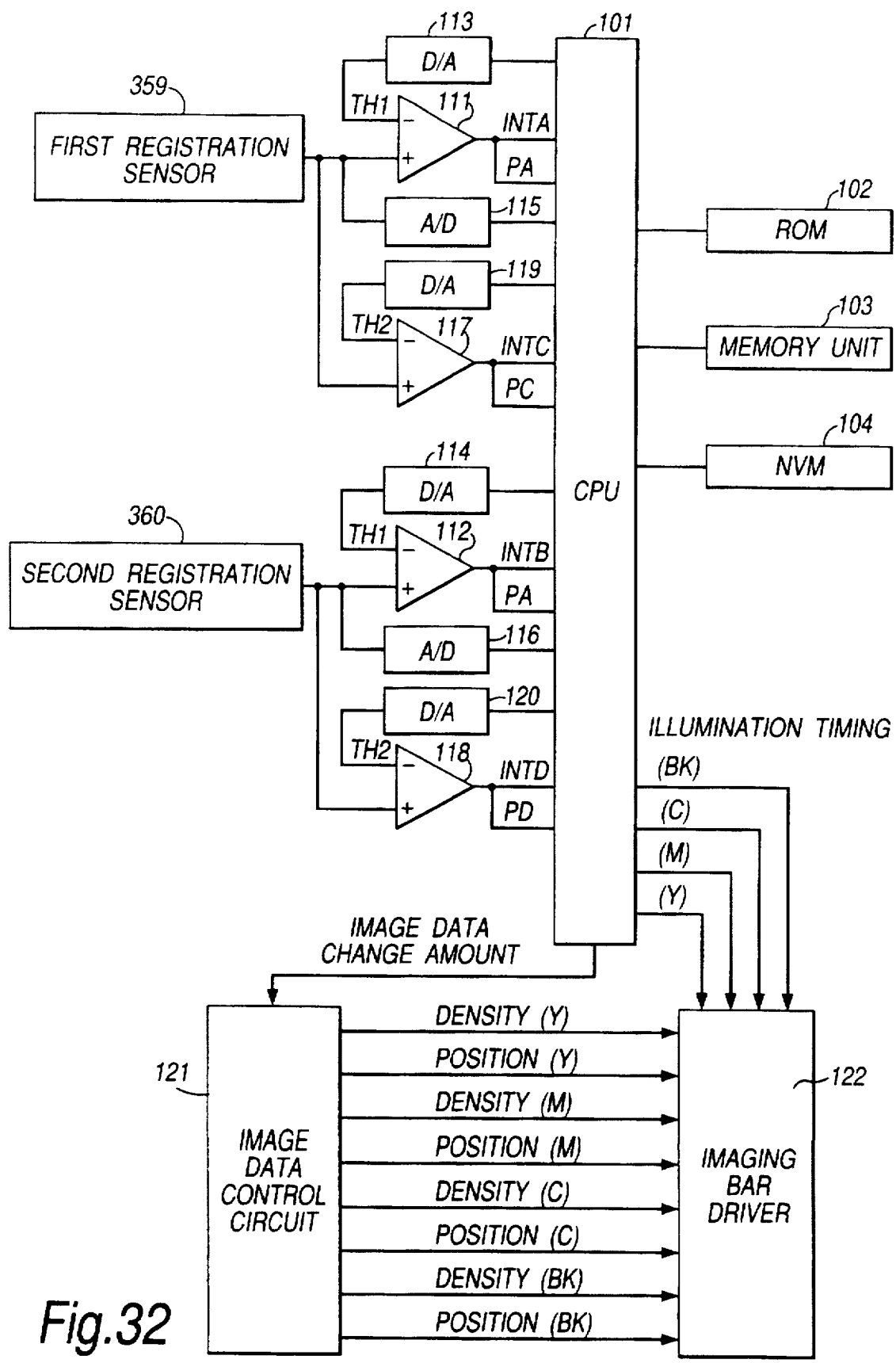
FIG. 32 is a schematic block diagram showing the controller of the image forming apparatus including the misregistration detecting mechanism shown in FIG. 29.

FIGS. 30A through 30C show the relationship of locations between the registration sensor shown in FIG. 29 and a test pattern image $T_{VH}$ and the level of the output signal from the registration sensor. When the registration sensor shown in FIG. 29 is used, both the misregistrations in the main scanning direction and the sub-scanning direction can be detected by a same misregistration detecting routine according to a flowchart shown in FIG. 31. In addition, such a detecting circuit as shown in FIG. 32, which is a deformed detecting circuit of that shown in FIG. 3, is used.

In detail, when the test pattern image $T_{VH}$ is passing through one of the first and the second registration sensors 359 and 360, a part of the region of the test pattern image $T_{VH}$ extending in the sub-scanning direction is detected by the sensor. Here, the first registration sensor 359 and the first comparator 111 will be explained. The detailed explanation of the second registration sensor 360 and the second comparator 112 will be omitted as they are substantially identical to the first registration sensor 359 and the first comparator 111.

If a sensor output exceeding the first threshold level TH1 supplied from the D/A converter 113 is input to the non-inverted input terminal of the first comparator 111 by the first registration sensor 359, an interrupt signal is input to the port PA and the interrupt port INTA of the CPU 101 from the first comparator 111.

Here, the CPU 101 measures a time from when a portion of the test pattern image $T_{VH}$ in the sub-scanning direction was exposed and the output of the first comparator 111 is input to the port PA by the imaging bar which outputs the test pattern image which is a subject of measurement. At the same time, while the output from the first comparator 111 is continued, that is, the CPU 101 is being interrupted, it is judged whether the output is from a third comparator 117.

If the output from the third comparator 117 is input to the CPU 101, the sensor output exceeding the second threshold level TH2 supplied from the third D/A converter 119 is input to the non-inverted input terminal of the third comparator 117 by the first registration sensor 359 as shown in FIG. 30A. As a result, the CPU 101 judges that the test pattern image $T_{VH}$ has agreed with the arrangement of the optical fiber of the first registration sensor 359.

As a matter of course, if no output was input to the CPU 101 from the third comparator 117, it is judged that the test pattern image $T_{VH}$ does not agree with the arrangement of the optical fiber of the first registration sensor 359 as no signal exceeding the second threshold level TH2 is input as shown in FIG. 30B or 30C. If the test pattern image $T_{VH}$ agreed with the arrangement of the optical fiber of the first registration sensor 359, that is, when a signal exceeding the second threshold level TH2 is input to a third interrupt port INTC and the port PC, the CPU 101 stores the row wherein the luminous dot of the imaging bar recorded a region in the main scanning direction of the test pattern image $T_{VH}$ in the NVM 104. Similarly, the output of the fourth comparator 118 is input to the CPU 101 through a fourth interrupt port INTD by the threshold level TH2 from the fourth D/A converter 120.

In more detail, as shown in FIGS. 30B, 30A and 30C in order, the locations of dots illuminating the region in the main scanning direction of the test pattern image $T_{VH}$ is moved by one row and the luminous dot locations where the test pattern image $T_{VH}$ agrees with the arrangement of the optical fibers of the first registration sensor 359 are detected.

As described above, the CPU 101 measures phase differences of the imaging bars in the main scanning and sub-scanning directions. Further, this operation is repeated up to the second through the fourth imaging bars according to the flowchart shown in FIG. 31 and furthermore, at the point of time when phase differences of all imaging bars are detected, the exposing timing in the sub-scanning direction and the exposure start position of respective imaging bars are input to the NVM 104.

That is, the CPU 101 clears n of the memory unit 103, that is, n =0. Reference mark n denotes the number of luminous dots to record the region extended in the sub-scanning direction of the test pattern image $T_{VH}$ and finally, denotes the number of luminous dots agreed with the aperture (ST3101).

The CPU 101 counts up the number of dots by adding 1 to n of the memory unit 103. That is, the CPU 101 instructs the image data control circuit 121 to shift the luminous dots for recording the region extended in the sub-scanning direction of the test pattern image $T_{VH}$ by one dot in the main scanning direction (ST3102).

The CPU 101 instructs an imaging bar driver 122 to light the test pattern and the imaging bars record the test pattern on the photosensitive drums. Further, at the same time, the CPU 101 starts the time measurement (ST3103).

The test pattern image $T_{VH}$ is conveyed by the conveyer belt 51 and detected by the first registration sensor 359, and a sensor output signal is output. This sensor output signal is input to the non-inverted input terminal of the first comparator 111 and compared with the first threshold level TH1 by the first comparator 111. If the sensor output is less than or equal to TH1, an interrupt signal is input to the CPU 101 through the first interrupt port INTA (FIG. 30B). On the other hand, if the sensor output is greater than or equal to TH1, no interrupt signal is input to the CPU 101 and the steps ST3102 through ST3104 are executed again (ST3104).

When an interrupt signal is input to the CPU 101 through the first interrupt port INTA, the CPU 101 terminates the time measurement (ST3105).

Furthermore, the test pattern image $T_{VH}$ is conveyed by the conveyer belt 51 and detected by the first registration sensor 359, and the sensor output signal is output. This sensor output signal is input to the non-inverted input terminal of the third comparator 117 and compared with the second threshold level TH2 by the third comparator 117. If the sensor output is less than or equal to TH2, an interrupt signal is input to the CPU 101 through the third interrupt port INTC (FIG. 30A). On the other hand, if the sensor output is greater than or equal to TH2, no interrupt signal is input to the CPU 101 and the steps ST3102 through ST3107 are executed again (ST3106).

When an interrupt signal is input to the CPU 101 through the third interrupt port INTC, the CPU 101 stores the measured time in the memory unit 103 (ST3107).

Further, the CPU 101 stores a luminous dot (the n-th dot) agreed with the aperture in the memory unit 103 (ST3108).

The CPU 101 judges whether the steps ST3101 through ST3109 have been executed on all the imaging bars and executes the steps ST3101 through ST3109 for the imaging bar for which the steps were not executed (ST3109).

When the above steps have been executed/completed, the CPU 101 reads the luminous dots agreed with the apertures of respective imaging bars and computes a phase difference of each imaging bar. Based on the result of this computation, the CPU 101 determines the shift amount of image data of each imaging bar and instructs the image data control circuit 121 to shift image data. The image data control circuit 121 shifts image data according to the instruction by the CPU 101 (ST3110).

Further, the CPU 101 reads a measured time of each imaging bar from the memory unit 103, adjusts the light emitting timing of each imaging bar and stores the adjusted light emitting timing of each imaging bar in the memory unit 103. When performing the printing, make the printing based on the light emitting timings stored in the memory unit 103 (ST3111).

Figure 33:
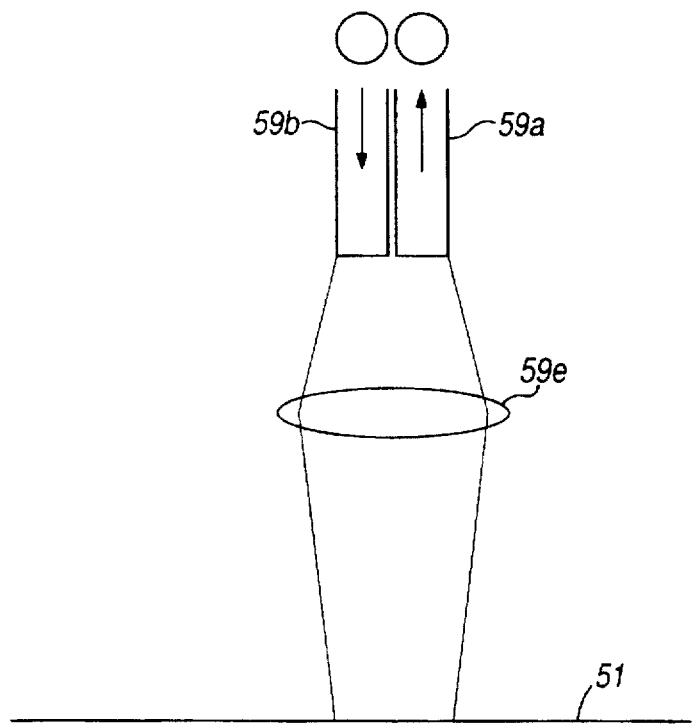
FIG. 33 is a schematic diagram showing a fifth embodiment of the misregistration detecting mechanism.

FIG. 33 shows a fifth embodiment of the registration sensor.

As shown in FIG. 33, an objective lens (a convex lens) 59e having a specified focal distance is arranged between the first and second optical fibers 59b and 59c arranged in a row and the conveyer belt 51.

Figure 34A:
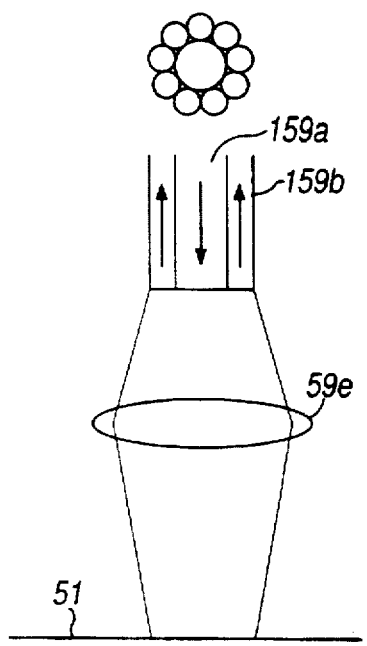
FIGS. 34A and 34B are schematic diagrams showing a sixth and a seventh embodiments of the misregistration detecting mechanism.
Figure 34B:
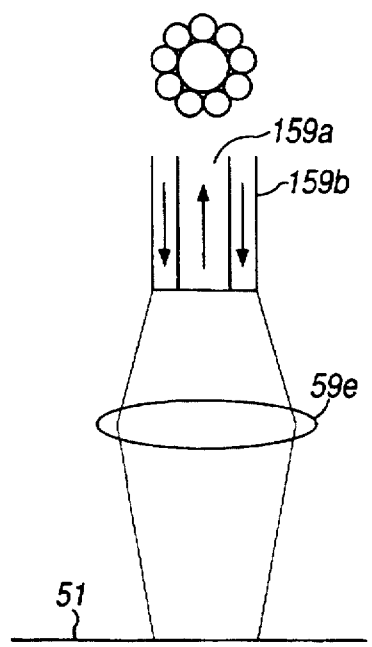

FIGS. 34A and 34B show a sixth and a seventh embodiments of the registration sensor. As shown in FIG. 34A, the registration sensor is comprised of a plurality of the second optical fibers 159b arranged around the first optical fiber 159a and an objective lens (a convex lens) 59e having a specified focal distance arranged between the optical fibers 159a, 159b and the conveyer belt 51. Such the construction containing the objective lens (the convex lens) 59e is also applicable to a registration sensor using a plurality of the first optical fibers 159a arranged around the second optical fiber 159b as shown in FIG. 34B.

According to the registration sensor shown in FIGS. 33, 34A and 34B, when a magnification of the objective lens (the convex lens) 59e is set at an optimum level, it becomes possible to prevent the light incoming surface of the second optical fiber and the light outgoing surface of the first optical fiber of the registration sensor from being contaminated by toner or residues of paper P which may scatter in the vicinity of the conveyer belt 51. That is, even when, for instance, the outer diameters, core diameters and the numerical apertures of the first and the second optical fibers are made small in order to improve detecting accuracy, a detecting region will become large if a distance between the fiber openings and the conveyer belt surface becomes large. Therefore, it is desirable that the fiber openings are arranged as close as to the belt surface. However, the fiber openings may be contaminated by toners on the belt surface and residues of paper P or dust and the like. Further, there is also such a problem that unfixed toner may adhere to the openings of the optical fibers when a paper jamming is caused. In this case, it may become impossible to detect a test pattern.

According to the registration sensor shown in FIGS. 33, 34A and 34B, as it becomes possible to move the fiber openings away from the conveyer belt surface, the secular change of sensitivity of image detecting is reduced.

Figure 35:
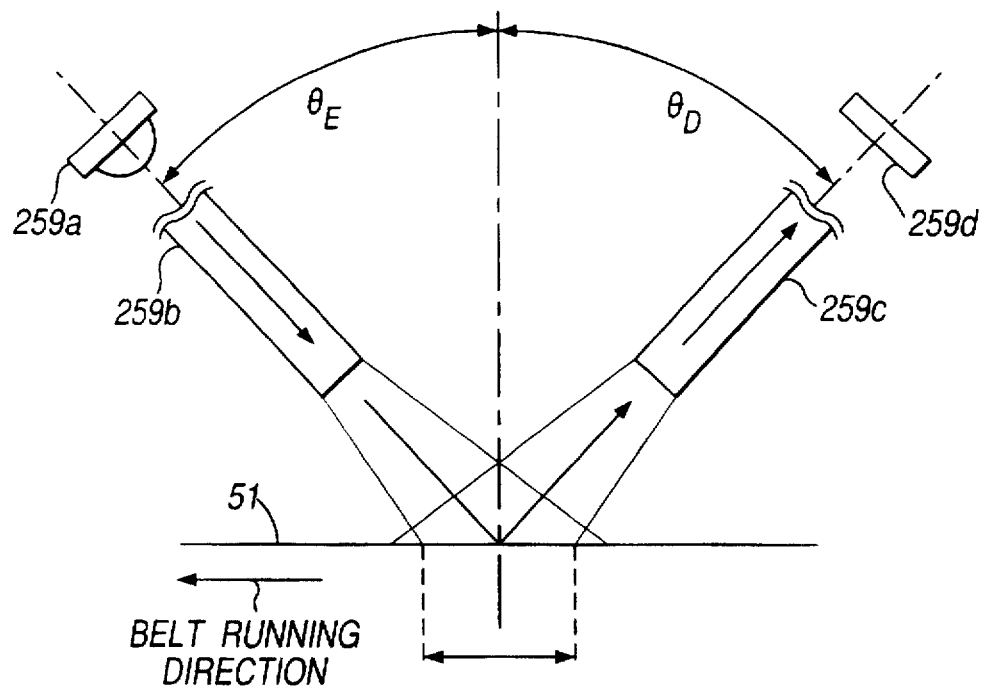
FIG. 35 is a schematic diagram showing an eighth embodiment of the misregistration detecting mechanism.

FIG. 35 shows an eighth embodiment of the registration sensor. This registration sensor has the first optical fiber 259b arranged rectilinearly along the sub-scanning direction, that is, the running direction of the conveyer belt and the second optical fiber 259c which detects the reflecting light from a region illuminated by the illuminating light from the first optical fiber 259b. Further, on the end surface of the first optical fiber 259b at the side opposite to the conveyer belt 51, a light source 259a is arranged. In addition, at the end surface of the second optical fiber 259c at the side opposite to the conveyer belt 51, there is arranged an optical sensor 259d which photoelectrically converts the light guided by the second optical fiber 259c.

According to the registration sensor shown in FIG. 35, as the first and the second optical fibers 259b and 259c are arranged at an angle of tilt $\theta_E$ and $\theta_D$ to the normal line L that is vertical to the plane surface of the conveyer belt 51, more stabilized output is obtained.

Figure 36:
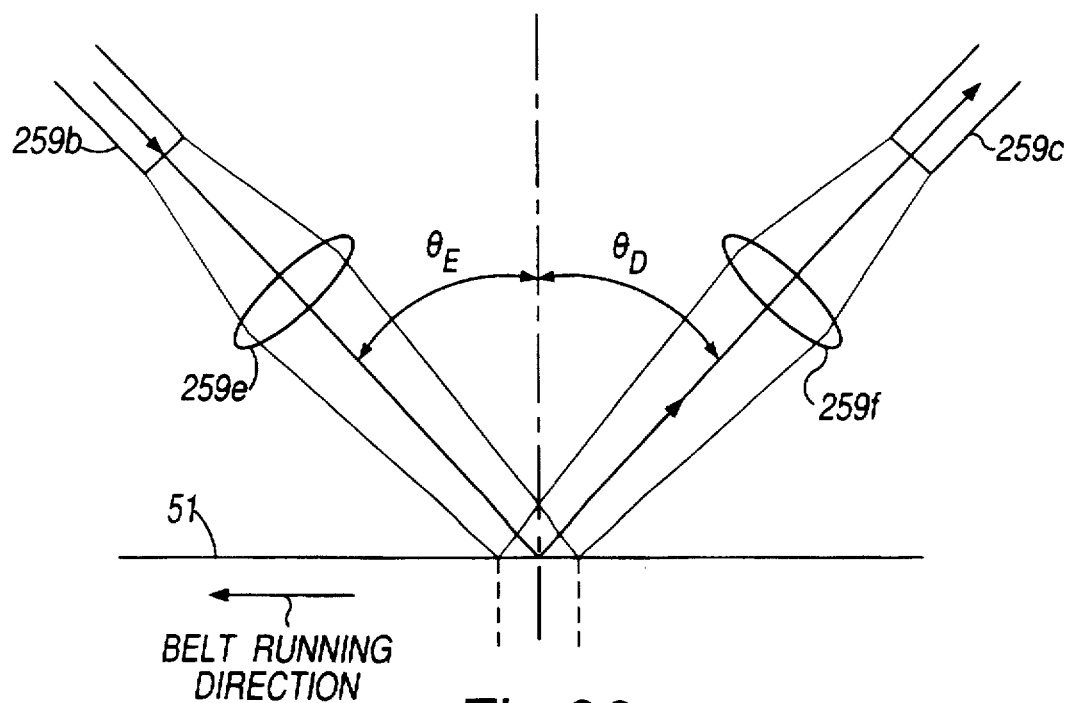
FIG. 36 is a schematic diagram showing a ninth embodiment of the misregistration detecting mechanism.

FIG. 36 shows a ninth embodiment of the registration sensor. This registration sensor has objective lenses 259e and 259f arranged between the first and the second optical fibers 259b and 259c of the registration sensor shown in FIG. 35 and the conveyer belt 51.

According to this ninth embodiment, the detecting accuracy is improved and the secular change of sensitivity of image detecting is prevented for the same reason as in the example explained above referring to FIGS. 33 and 34.

Figure 37:
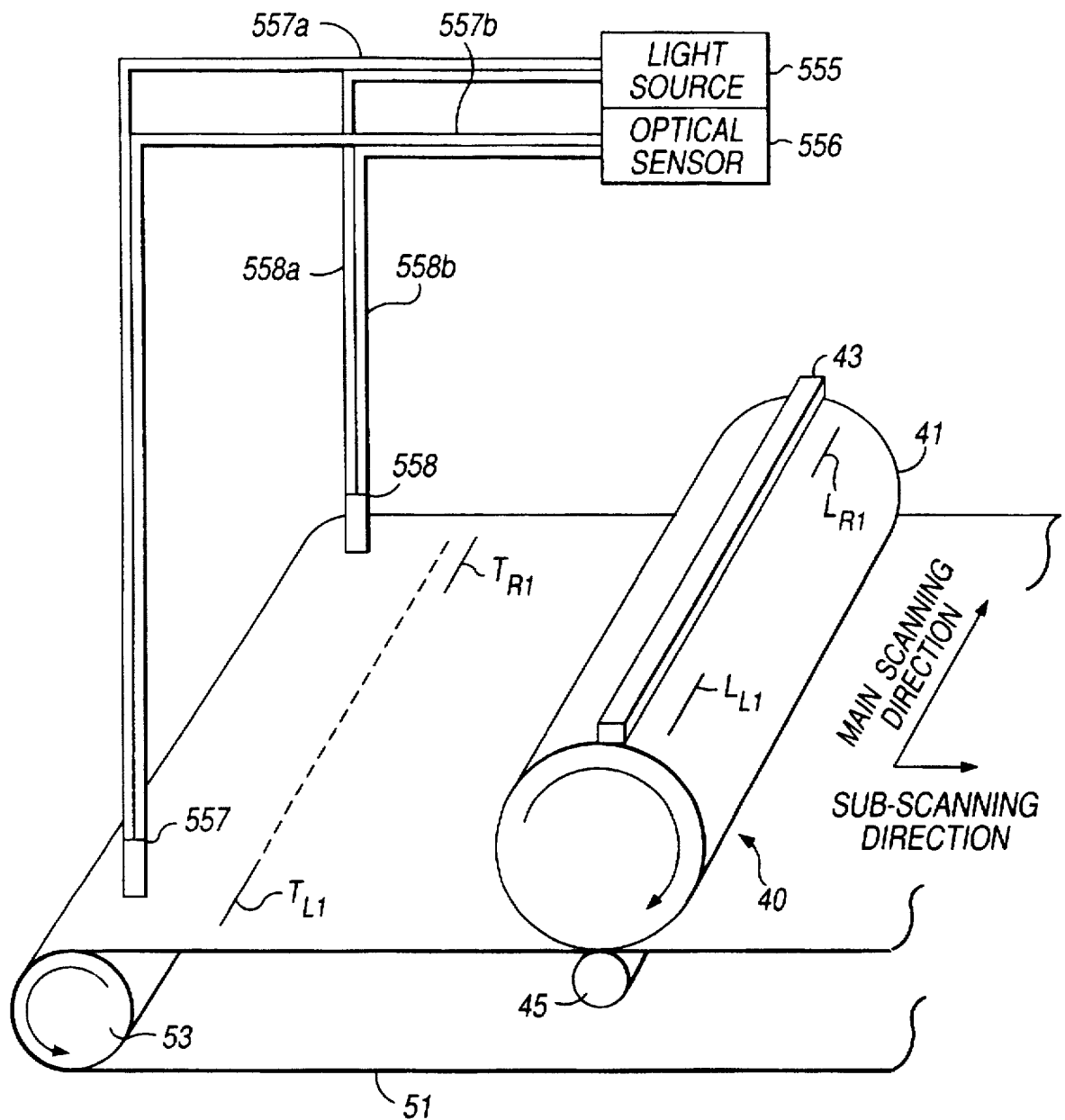
FIG. 37 is a schematic diagram showing a tenth embodiment of the misregistration detecting mechanism.

FIG. 37 is a schematic diagram showing a tenth embodiment of a misregistration detecting mechanism differing from the misregistration detecting mechanism shown in FIG. 2. Further, the misregistration detecting mechanism shown in FIG. 37 may be incorporated in the image forming apparatus shown in FIG. 1 instead of the misregistration detecting mechanism.

As shown in FIG. 37, the misregistration detecting mechanism has a light source 555 and an optical sensor 556 which photoelectrically converts the reflecting light from the conveyer belt 51, which is the illuminating light generated by the light source 555 and returned by the optical fiber shown below.

Between the light source 555 and the optical sensor 556, there are a first and a second registration detecting portions 557 and 558 arranged with a specified distance in the main scanning direction.

The first registration detecting portion 557 has a first optical fiber 557a which guides the light from the light source 555 to a specified location of the conveyer belt 51, and a second optical fiber 557b which guides the light guided to the conveyer belt 51 by the first optical fiber 557a and reflected thereon to the optical sensor 556.

The second registration detecting portion 558 has a third optical fiber 558a which guides the light from the light source 555 to a specified location of the conveyer belt 51, and a fourth optical fiber 558b which guides the light guided to the conveyer belt 51 by the third optical fiber 558a and reflected thereon to the optical sensor 556.

That is, the first registration detecting portion 557 comprises the first optical fiber 557a, in which one end thereof is optically connected to the light source 555 and the other end thereof faces the conveyer belt 51 for guiding the light from the light source 555 and illuminating the conveyer belt 51 to obtain the reflected light, and the second optical fiber 557b, in which one end thereof is optically connected to the optical sensor 556 and the other end thereof faces the conveyer belt 51 for guiding the reflected light to the optical sensor 556.

Further, the second registration detecting portion 558 comprises the third optical fiber 558a, in which one end thereof is optically connected to the light source 555 and the other end thereof faces the conveyer belt 51 for guiding the light from the light source 555 and illuminating the conveyer belt 51 to obtain the reflected light, and the fourth optical fiber 558b, in which one end thereof is optically connected to the optical sensor 556 and the other end thereof faces the conveyer belt 51 for guiding the reflected light to the optical sensor 556.

Hereinafter, the tilt described above is detected on all of the first through the fourth image forming units according to the flowchart shown in FIG. 13A (see FIGS. 37 and 38).

The imaging bar driver 122 records a first test pattern $L_{L1}$ on the photosensitive drum 41 by the imaging bar 43 of the fourth image forming unit according to the instruction by the CPU 101. At the same time, the CPU 101 starts the time measurement. The first test pattern $L_{L1}$ is developed by the developing device 44 and further, transferred on the conveyer belt 51 as the first test pattern image $T_{L1}$ by the transfer roller 45 (ST1301).

The CPU 101 terminates the time measurement after Δt Sec. has passed (ST1302).

Then, after terminating the time measurement, the CPU 101 records a second test pattern $L_{R1}$ by the imaging bar 43 likewise the step ST1301 (ST1303).

The first test pattern image $T_{L1}$ is conveyed by the conveyer belt 51 and detected by the first registration detecting portion 557, and the sensor output signal is output. This sensor output signal is input to the CPU 101 through the first interrupt port INTA as an interrupt signal (ST1304).

When the interrupt signal is input to the first interrupt port INTA, the CPU 101 starts the time measurement (ST1305).

The second test pattern image $T_{R1}$ is conveyed by the conveyer belt 51 and detected by the second registration detecting portion 558, and the sensor output signal is output. This sensor output signal is input to the CPU 101 through the first interrupt port INTA as an interrupt signal (ST1306).

When the interrupt signal is input to the first interrupt port INTA, the CPU 101 terminates the time measurement (ST1307).

The CPU 101 judges whether a time t measured according to the steps ST1305 through ST1307 is t=Δt, and if t=Δt, judges that there is no tilt and if t≠Δt, judges that there is a tilt (ST1308).

When judging that there is a tilt, the CPU 101 computes a tilt by a time difference as described later (ST1309).

The tilt computed by the CPU 101 is stored in the memory unit 103 (ST1311).

The CPU 101 judges whether the steps ST1301 through ST1310 were executed on all the imaging bars and executes the steps ST1301 through ST1310 for the imaging bar for which the above steps were not executed (ST1311).

After executing the steps ST1301 through ST1310 for all the imaging bars, the CPU 101 computes image data changing amount of the imaging bars of the first through the fourth image forming units according to the method descried in FIGS. 9A through 12B. This image data changing amount is input to the image data control circuit 121. Further, the image data control circuit 121 rearranges image data corresponding to respective imaging bars (ST1312).

The tilt in ST1309 is computed and detected as described below.

FIG. 13B is a top view showing the photosensitive drum 41 of the fourth image forming unit 40 and the tilt of the imaging bar 43 when viewed from the top of the imaging bar. In this example, a case is assumed, wherein the right side of the running direction of the conveyer belt, that is, the second registration detecting portion 558 is tilted based on the left side of the running direction of the belt, that is, the first registration detecting portion 557 side.

Figure 13A:
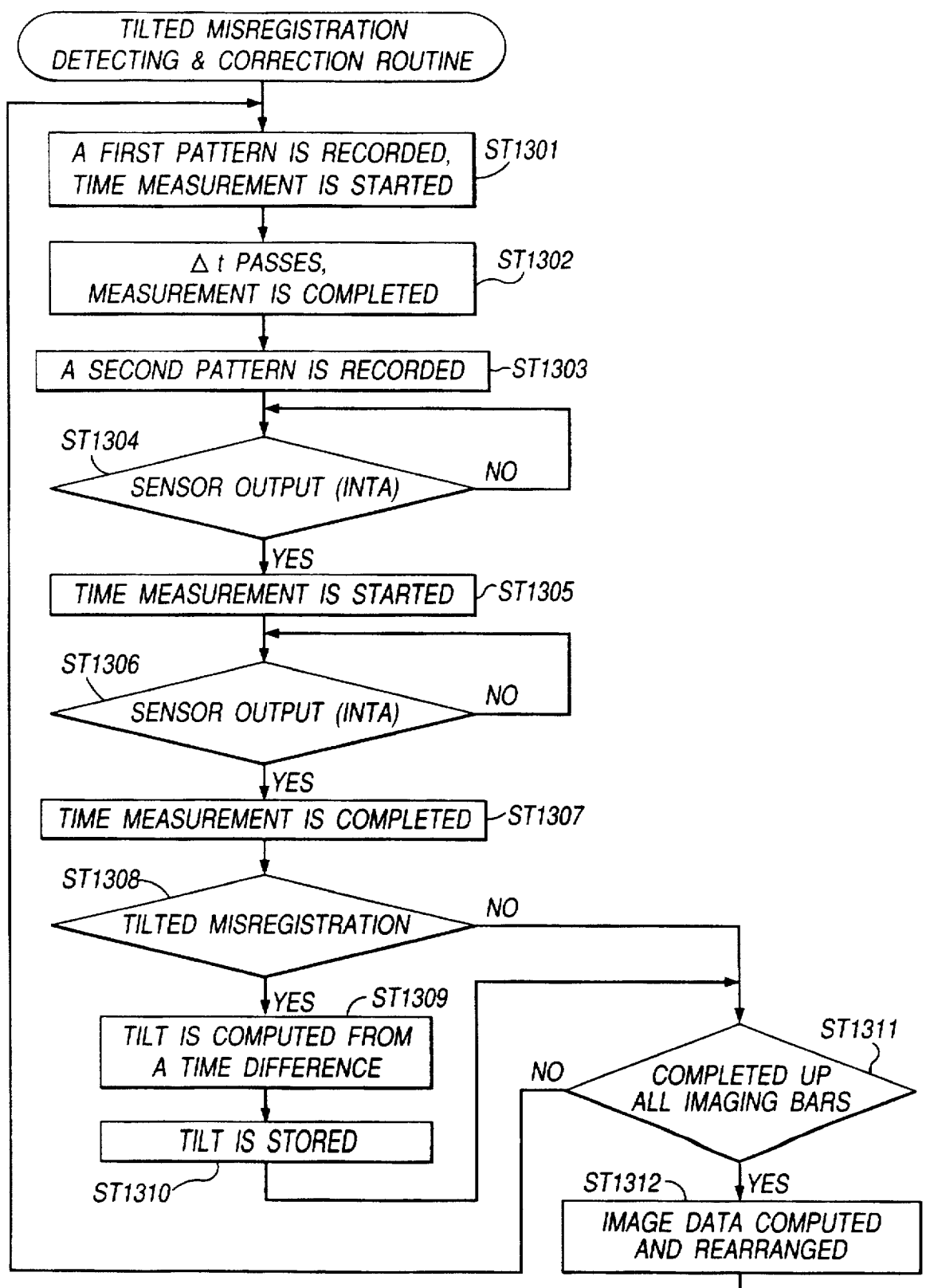
FIG. 13A is a flowchart showing another example of the operation for rearranging image data by detecting the tilted misregistration using the misregistration detecting mechanism shown in FIG. 37.

If a time from when the first test pattern image $T_{L1}$ is detected by the first registration detecting portion 557 until the second test pattern image $T_{R1}$ is detected by the second registration detecting portion 558, that is, a time measured by the CPU 101 in the steps ST1304 through ST1307 shown in FIG. 13A is t, the tilt θ is expressed by the following expression:

$$\theta = \arctan\{Vp \times (t-\Delta t)/L\}$$

where,

Vp: Velocity of the outer surface of the photosensitive drum (equal to the moving velocity of the conveyer belt).

L: Maximum printing region of the imaging bar.

Δt: A time difference for recording the first test pattern $L_{L1}$ and the second test pattern $L_{R1}$ by the imaging bar.

In the above example, it is judged that the imaging bar is tilted in the following direction in FIG. 13B.

t=Δt: No tilt (Reference Numeral 43 in FIG. 13B)

t<Δt: The direction reverse to the belt running direction (Reference Numeral 43b in FIG. 13B)

t>Δt: The belt running direction (Reference Numeral 43a in FIG. 13B)

As described above, at Δt seconds after the first test pattern image $T_{L1}$ is formed at a position corresponding to either the first registration detecting portion 557 or the second registration detecting portion 558 as shown by the dotted line in FIG. 37 by one of the first through the fourth image forming units 10, 20, 30 and 40, the second test pattern image $T_{R1}$ is recorded at the position corresponding to the remaining registration sensor. If a time difference t is "t=Δt" when the test pattern images $T_{L1}$ and $T_{R1}$ are detected by the first and the second registration detecting portions 557 and 558, it can be detected that there is no tilt.

Figure 38:
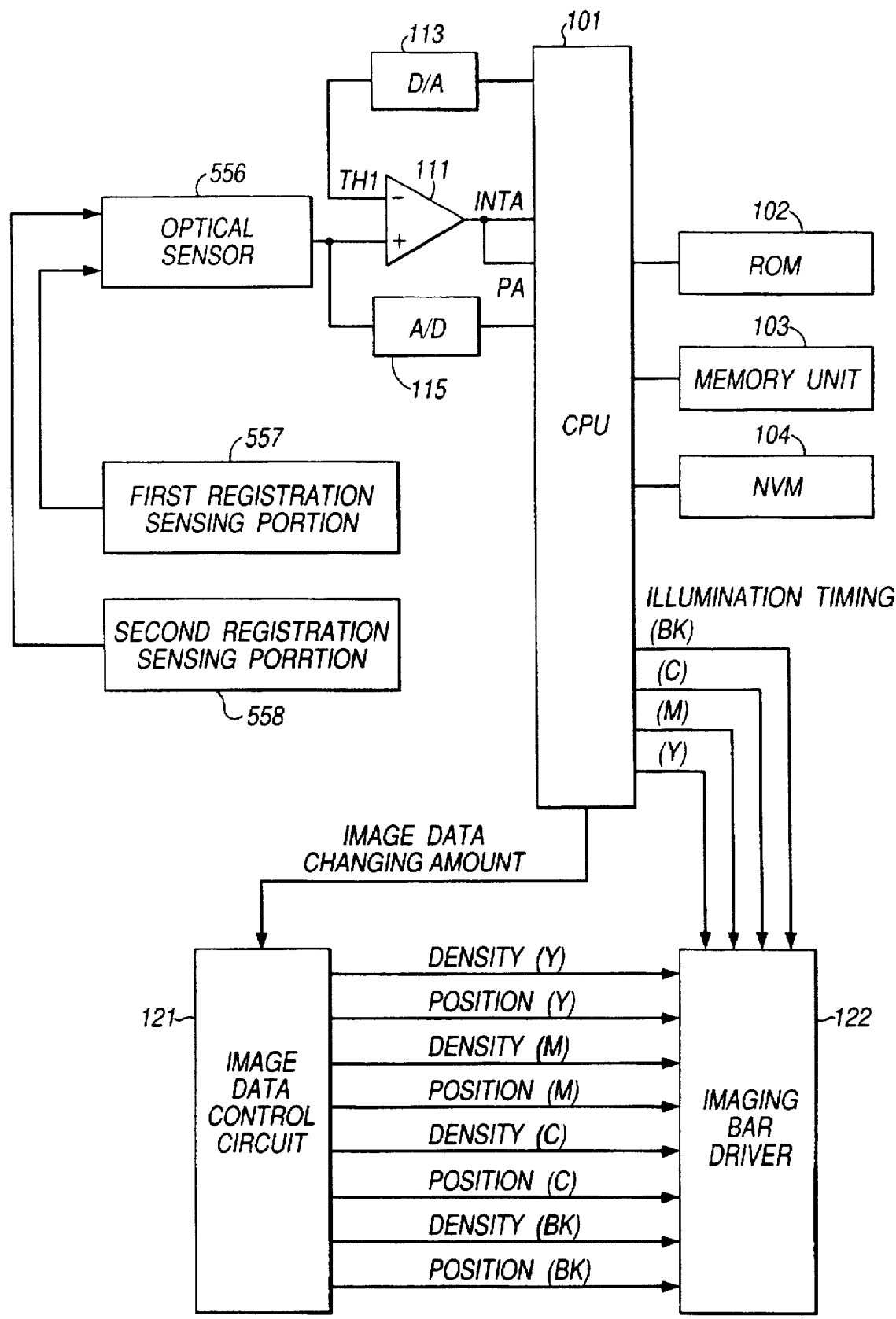
FIG. 38 is a schematic block diagram showing the controller of the image forming apparatus including the misregistration detecting mechanism shown in FIG. 37.

FIG. 38 shows a detecting circuit adaptable to the misregistration detecting mechanism shown in FIG. 37.

The first test pattern image $T_{L1}$ is passed through an illuminating region of the first optical fiber 557a of the first registration detecting portion 557 by the detecting circuit shown in FIG. 38. When passing this illuminating region, the reflecting light from the conveyer belt 51 taken out by the second optical fiber 557b is photoelectrically converted and input to the non-inverted input terminal of the first comparator 111. Further, the second test pattern image $T_{R1}$ is passed through the illuminating region of the first optical fiber 558a of the second registration detecting portion 558. When passing this illuminating region, the reflecting light from the conveyer belt 51 taken out by the second optical fiber 558b is photoelectrically converted and similarly, input to the non-inverted input terminal of the first comparator 111.

Thus, under the condition that there is no misregistration in the main scanning direction, the positions of the first and the second test pattern images $T_{L1}$ and $T_{R1}$ are easily detected by the detecting circuit shown in FIG. 38.

By the way, as already explained in FIG. 21, a number of scratches F may be produced on the conveyer belt 51 along the sub-scanning direction. Further, as shown in FIG. 39A, such scars as x, y and z which provide an undesirable reflecting light to the first and the second registration sensors may be produced on the conveyer belt 51.

Figure 39A:
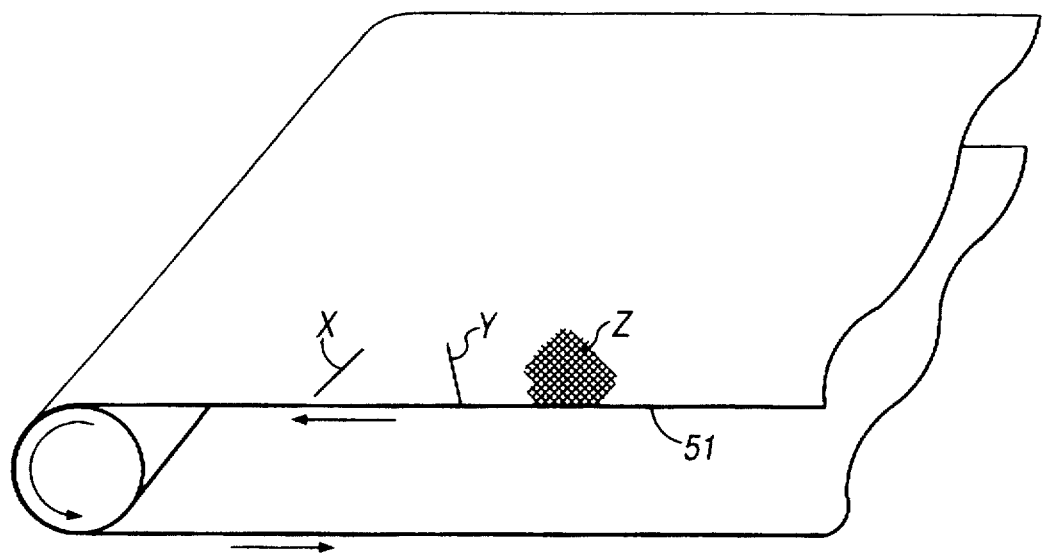
FIGS. 39A and 39B are a perspective view showing an example of damages which may be produced on the conveyer belt by the image forming apparatus shown in FIG. 1 and a graph showing outputs of corresponding sensors.
Figure 39B:
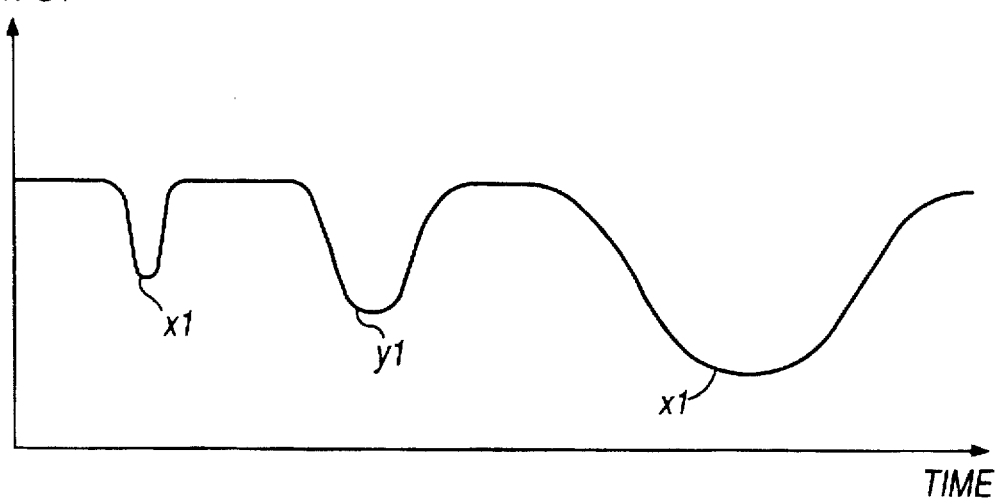

As the scars x, y and z shown in FIG. 39A are output as signals having sufficient level when compared with the threshold level TH1 as shown in FIG. 39B, it is substantially required to exchange the conveyer belt 51.

However, the exchange of the conveyer belt 51 has such a problem that the image forming apparatus is made unusable for an extended period of time.

Figure 40:
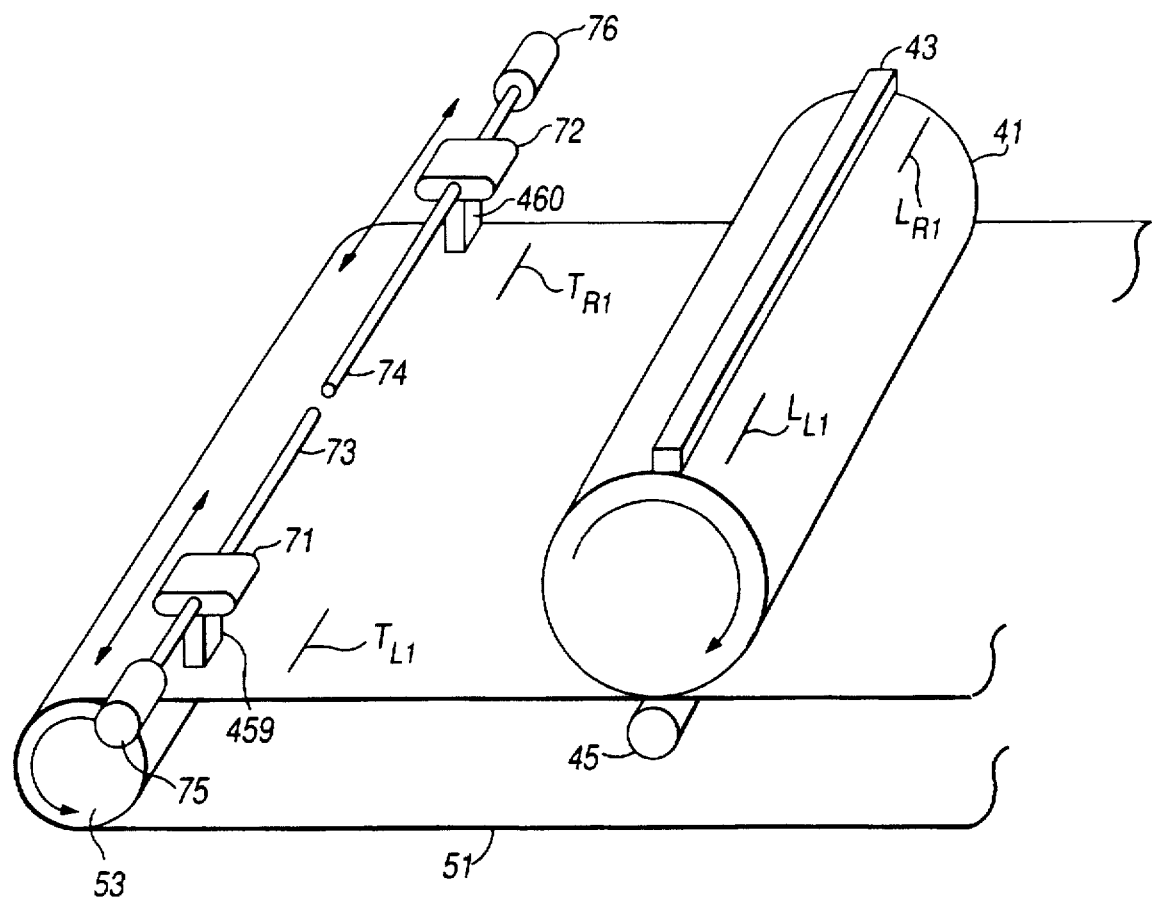
FIG. 40 is a schematic diagram showing an eleventh embodiment of the misregistration detecting mechanism.

FIG. 40 shows an eleventh embodiment of a misregistration detecting mechanism which is differing from the misregistration detecting mechanism shown in FIGS. 2 and 37. Further, the misregistration detecting mechanism shown in FIG. 40 may be incorporated in the image forming apparatus shown in FIG. 1 instead of the misregistration detecting mechanism shown in FIGS. 2 and 37.

As shown in FIG. 40, this misregistration detecting mechanism has a first and a second registration detecting portions 459 and 460 which are arranged with a specified distance in the main scanning direction.

The first and the second registration detecting portions 459 and 460 are used in the registration sensors in any shape shown in many embodiments already explained, for instance, the registration sensor shown in FIG. 22. The first and the second optical fibers incorporated in respective registration sensors, the light source and the optical sensor are substantially identical to those in the examples shown in FIG. 2 and therefore, the detailed explanation will be omitted.

The first and the second registration detecting portions 459 and 460 are supported movable in the main scanning direction by sensor supporters 71 and 72. The sensor supporters 71 and 72 are moved to the specified positions in the main scanning direction through a first and a second sensor moving mechanisms 73 and 74, which are represented by a linear driving mechanism or a straight driving mechanism.

Figure 41:
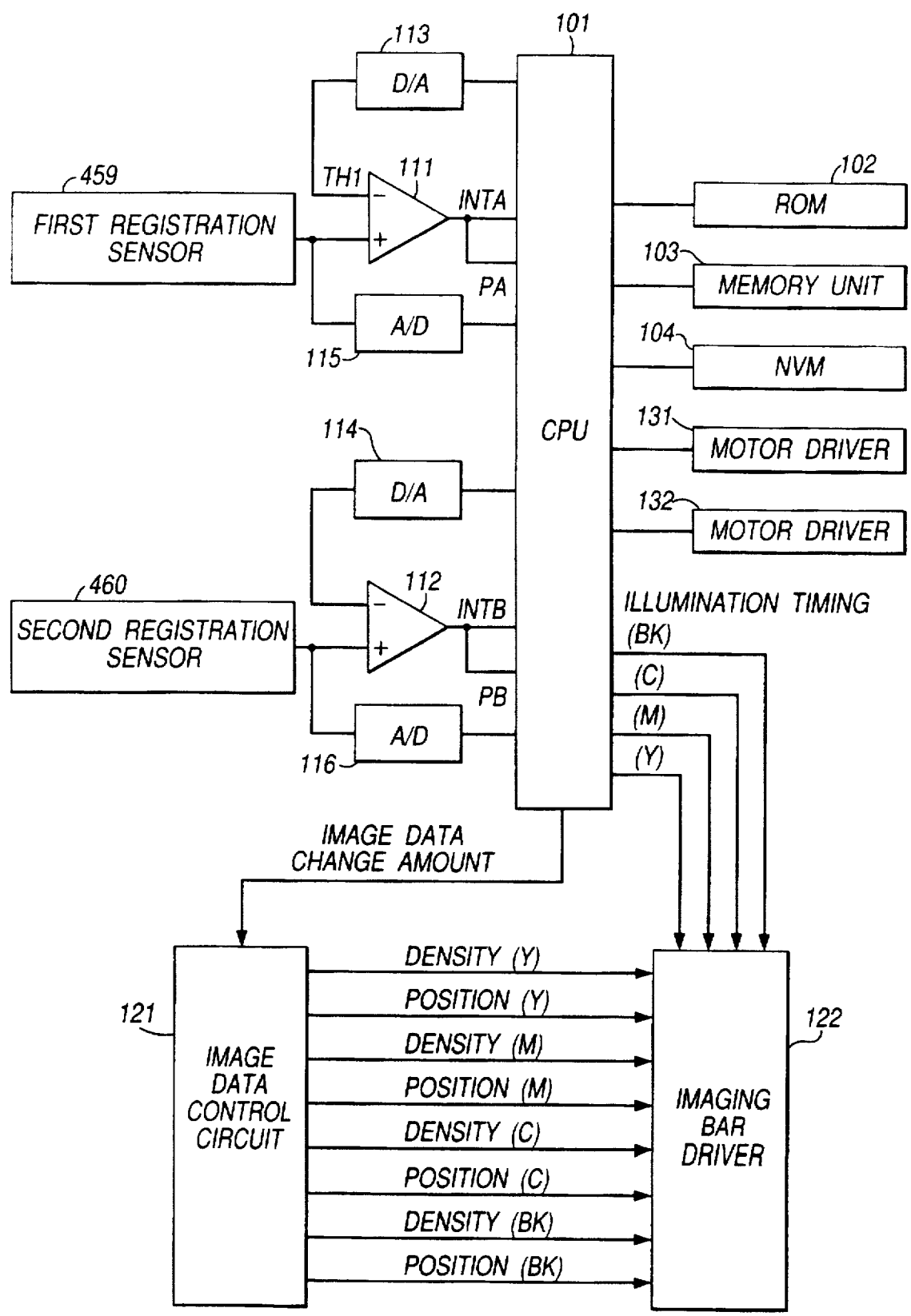
FIG. 41 is a schematic block diagram showing the controller of the image forming apparatus including the misregistration detecting mechanism shown in FIG. 40.

FIG. 41 shows a detecting circuit adaptable to the misregistration detecting mechanism shown in FIG. 40.

In the detecting circuit shown in FIG. 41, in the state where the conveyer belt 51 only is running prior to the forming of the test pattern images $T_{L1}$ and $T_{R1}$ on the conveyer belt 51, at least when the conveyer belt 51 is running for more than one turn, the outputs of the first and the second comparators 111 and 112 are monitored.

In detail, if such scars as shown in FIG. 39A are produced on the conveyer belt 51, the output signal from either the first or the second registration detecting portion 459 or 460 or both detecting portions becomes a signal at a level which is hardly discriminated from the threshold level TH1 as shown in FIG. 39B.

In this case, the CPU 101 will judge that there are undesirable scars on the conveyer belt 51 assuming that there is no test pattern image formed.

If any scar was detected on the conveyer belt 51, motors 75 and 76 for moving the sensor supporter 71 or 72 supporting a corresponding registration detecting portion in the main scanning direction are moved by a specified distance in any direction by a corresponding motor driver 131 or 132. In succession, while the conveyer belt 51 is running at least more than one rotation, the outputs of the first and the second comparators 111 and 112 are monitored and the scar of the conveyer belt 51 corresponding to the moved position is checked.

Here, under the condition that scars of the conveyer belt 51 are not detected, the test pattern images $T_{L1}$ and $T_{R1}$ are formed successively on the conveyer belt 51 and misregistrations are detected likewise the already explained embodiments. On the other hand, if scars on the conveyer belt 51 were detected, the corresponding registration detecting portions are further moved within a movable range by the first and the second sensor moving mechanisms 73 and 74. If any region having no scar is not detected on the conveyer belt 51 within the movable range by the first and the second sensor moving mechanism 73 and 74, the motor 54 is stopped by the control of the CPU 101, a service call is displayed on the display unit (not shown) and the exchange of the conveyer belt 51 is instructed.

As described above, according to the image forming apparatus of the present invention, images formed on a plurality of photosensitive drums which are provided corresponding to respective decomposed colors by the imaging bars which form latent images on the photosensitive drum image carriers and converted into toner images corresponding to respective color components through developing devices are transferred on the conveyer belt and conveyed by the conveyer belt, and deviations from standard values are computed by the first and the second registration sensors. Thus, it becomes easy to detect factors for misregistrations of color images produced when toner images corresponding to color components are superposed in the image forming apparatus, which are represented by tilts between respective photosensitive drums and imaging bars corresponding thereto, tilts between respective photosensitive drums and the conveyer belt, deviations in distance between the positions of respective photosensitive drums and deviations between rotary directions of respective photosensitive drums and the conveyer belt and directions orthogonal to the rotary directions.

Further, if scratches or scars are produced on the conveyer belt, which may provide undesired detecting outputs to the first and the second registration sensors, the first and the second registration sensors are moved optionally to positions where only a desired output signal is provided by the conveyer belt as they are formed movable in the direction orthogonal to the rotary direction of the conveyer belt. Thus, factors for misregistrations of color images which may be produced when toner images are superposed in the image forming apparatus can be detected precisely.

On the basis of the factors for misregistrations of color images thus obtained, when positions of image data in the memory supplied to the specified light sources of the imaging bars and successive light emitting timings between the light sources and the adjacent light sources are changed based on the light emitting timings of the imaging bars and image data, misregistrations of color images of output images can be removed easily.

What is claimed is:

1. An image forming apparatus comprising:
   a plurality of latent image forming means for forming latent images on a plurality of image carriers;
   a plurality of developing means, arranged corresponding to the image carriers, for forming developed images by developing the latent images formed by the latent image forming means;
   means for conveying the developed images formed by the developing means;

means for detecting the developed images being conveyed on the image conveying means, the detecting means including a light source, a first optical fiber element for guiding a light from the light source and illuminating the image conveying means to obtain reflected light, a second optical fiber element for guiding the reflected light in a specified direction, and a light receiving element for converting the reflected light guided by the second optical fiber element into an electric signal;

means for computing a misregistration correcting amount to correct misregistration of each of the developed images conveyed by the image conveying means based on the detecting result of the detecting means; and means for executing correction of the misregistration based on the computed result of the computing means.

2. An image forming apparatus as claimed in claim 1, wherein the second optical fiber element of the detecting means is arranged in line in a direction parallel to a moving direction of the image conveying means against the first optical fiber element.

3. An image forming apparatus as claimed in claim 1, wherein the second optical fiber element of the detecting means is arranged in line in a direction orthogonal to a moving direction of the image conveying means against the first optical fiber element.

4. An image forming apparatus as claimed in claim 1, wherein the detecting means further includes an objective lens arranged between a set of the first and second optical fiber elements and the image conveying means.

5. An image forming apparatus as claimed in claim 1, wherein the first optical fiber element and the second optical fiber element of the detecting means are arranged with specified angle of incidence and angle of reflection provided against a normal line which is vertical to a plane surface of the image conveying means.

6. An image forming apparatus as claimed in claim 5, wherein the detecting means further includes a first objective lens arranged between the first optical fiber element and the image conveying means and a second objective lens arranged between the second optical fiber element and the image conveying means.

7. An image forming apparatus as claimed in claim 1, wherein the second optical fiber element of the detecting means includes a plurality of optical fiber elements arranged to surround the first optical fiber element.

8. An image forming apparatus as claimed in claim 1, wherein the second optical fiber element of the detecting means includes a plurality of optical fiber elements arranged to surround the second optical fiber element.

9. An image forming apparatus as claimed in claim 1, wherein the detecting means includes a first and a second detecting unit which are comprised of a set of the first and the second optical fiber elements, and the first and the second detecting units are arranged in a straight line in a direction orthogonal to a moving direction of the image conveying means.

10. An image forming apparatus as claimed in claim 1, wherein the detecting means includes a first and a second detecting unit which are comprised of a set of the first and the second optical fiber elements, and the first and the second detecting units are arranged in a straight line in a direction parallel to a moving direction of the image conveying means.

11. An image forming apparatus as claimed in claim 1, wherein the detecting means includes a first and a second detecting unit which are comprised of a plurality of sets of the first and the second optical fiber elements, and the first detecting unit is arranged in a straight line in a direction parallel to a moving direction of the image conveying means, and the second detecting unit is arranged in a straight line in a direction orthogonal to the first detecting unit.

12. An image forming apparatus as claimed in claim 1, wherein the detecting means includes a first detecting unit comprising a set of the first and the second optical fiber elements and a second detecting unit comprising a set of the first and second optical fiber elements, the first detecting unit being arranged at one end side in a direction orthogonal to a moving direction of the image conveying means and the second detecting unit being arranged at the other end side in the direction orthogonal to the moving direction of the image conveying means.

13. An image forming apparatus comprising:

a plurality of latent image forming means for forming latent images on a plurality of image carriers;

a plurality of developing means, arranged corresponding to the image carriers, for forming developed images by developing the latent images formed by the latent image forming means;

means for conveying the developed images formed by the developing means;

means for detecting the developed images being conveyed on the image conveying means, the detecting means including:

a common light source;

a common light receiving element for converting a light into an electric signal;

a first detecting unit comprising a first optical fiber element, in which one end thereof is optically connected to the common light source and the other end thereof faces the image conveying means, for guiding the light from the common light source and illuminating the image conveying means to obtain reflected light, and a second optical fiber element, in which one end thereof is optically connected to the common light receiving element and the other end thereof faces the image conveying means, for guiding the reflected light to the common light receiving element; and a second detecting unit comprising a third optical fiber element, in which one end thereof is optically connected to the common light source and the other end thereof faces the image conveying means, for guiding the light from the common light source and illuminating the image conveying means to obtain reflected light, and a fourth optical fiber element, in which one end thereof is optically connected to the common light receiving element and the other end thereof faces the image conveying means, for guiding the reflected light to the common light receiving element;

means for computing a misregistration correcting amount to correct the misregistration of each of the developed images conveyed by the image conveying means based on the detecting result of the detecting means; and means for executing correction of the misregistration based on the computed result of the computing means.

14. An image forming apparatus as claimed in claim 13, wherein the other ends of the first and second optical fiber elements of the first detecting unit are arranged at one end side in a direction orthogonal to a moving direction of the image conveying means, and the other ends of the third and fourth optical fiber elements of the second detecting unit are arranged at the other end side in the direction orthogonal to the moving direction of the image conveying means.

15. An image forming apparatus comprising:

a plurality of latent image forming means for forming latent images on a plurality of image carriers;

a plurality of developing means, arranged corresponding to the image carriers, for forming developed images by developing the latent images formed by the latent image forming means;

means for conveying the developed images formed by the developing means;

first detecting means for detecting the developed images conveyed on the image conveying means, the first detecting means including a first light source, at least one first optical fiber element for guiding the light from the first light source and illuminating the image conveying means to obtain reflected light, and at least one second optical fiber element, which is combined with the first optical fiber element, for guiding the reflected light in a specified direction;

second detecting means for detecting the developed images conveyed on the image conveying means, the second detecting means arranged with a space to the first detecting means in a direction orthogonal to a moving direction of the image conveying means and including a second light source, at least one third optical fiber element for guiding the light from the second light source and illuminating the image conveying means to obtain reflected light, and at least one fourth optical fiber element, which is combined with the third optical fiber element, for guiding the reflected light in a specified direction;

first supporting means for supporting the first detecting means movable in the direction orthogonal to the moving direction of the image conveying means;

second supporting means for supporting the second detecting means movable in the direction orthogonal to the moving direction of the image conveying means;

first moving means for moving the first supporting means along the direction orthogonal to the moving direction of the image conveying means;

second moving means for moving the second supporting means along the direction orthogonal to the moving direction of the image conveying means;

means for computing a misregistration correcting amount to correct misregistration of each of the developed images conveyed by the image conveying means based on the detecting results of the first and the second detecting means;

means for executing correction of the misregistration based on the computed result of the computing means; and means for changing a relative position between at least either the first or the second detecting means and the image conveying means.

16. An image forming apparatus comprising:

a plurality of latent image forming means for forming latent images on a plurality of image carriers;

a plurality of developing means, arranged corresponding to the image carriers, for forming developed images by developing the latent images formed by the latent image forming means;

means for conveying the developed images formed by the developing means;

means for detecting the developed images being conveyed on the image conveying means, the detecting means including a light source for illuminating the image conveying means to obtain reflected light, an optical fiber element for guiding the reflected light in a specified direction, and a light receiving element for converting the reflected light guided by the optical fiber element into an electric signal;

means for computing a misregistration correcting amount to correct the misregistration of each of the developed images conveyed by the image conveying means based on the detecting result of the detecting means; and means for executing correction of the misregistration based on the computed result of the computing means.

17. An image forming apparatus comprising:

image forming means for forming a prescribed image on an image carrier;

means for detecting the prescribed image formed by the image forming means on the image carrier, the detecting means including a light source for illuminating the image carrier to obtain a reflected light from the image carrier, an optical fiber element for guiding the reflected light in a specified direction, and a light receiving element for converting the reflected light guided by the optical fiber element into an electric signal; and control means for controlling the image forming means to correct a misregistration of the prescribed image from a desired position, where the prescribed image should be located, based on the detecting result of the detecting means and to form an image at the desired position.

18. An image forming apparatus comprising:

image forming means for forming a prescribed image on an image carrier;

means for detecting the prescribed image formed by the image forming means on the image carrier, the detecting means including a light source, an optical fiber element for guiding a light from the light source onto the image carrier to obtain a reflected light from the image carrier, and a light receiving element for converting the reflected light into an electric signal; and control means for controlling the image forming means to correct a misregistration of the prescribed image from a desired position, where the prescribed image should be located, based on the detecting result of the detecting means and to form an image at the desired position.

19. An image forming apparatus comprising:

image forming means for forming a prescribed image on an image carrier;

means for detecting the prescribed image formed by the image forming means on the image carrier, the detecting means including a light source, a first optical fiber element for guiding a light from the light source and illuminating the image carrier to obtain a reflected light, a second optical fiber element for guiding the reflected light in a specified direction, and a light receiving element for converting the reflected light guided by the second optical fiber element into an electric signal; and control means for controlling the image forming means to correct a misregistration of the prescribed image from a desired position, where the prescribed image should be located, based on the detecting result of the detecting means and to form an image at the desired position.

20. An image forming apparatus as claimed in claim 19, wherein the second optical fiber element of the detecting means is arranged in line in a direction parallel to a moving direction of the image carrier against the first optical fiber element.

21. An image forming apparatus as claimed in claim 19, wherein the second optical fiber element of the detecting means is arranged in line in a direction orthogonal to a moving direction of the image carrier against the first optical fiber element.

22. A pattern misregistration detecting apparatus comprising:

an image carrier carrying a prescribed pattern;

means for moving the image carrier in a specified direction;

means for detecting the prescribed pattern on the image carrier, the detecting means including a light source for illuminating the image carrier to obtain a reflected light from the image carrier, an optical fiber element for guiding the reflected light in a specified direction, and a light receiving element for converting the reflected light guided by the optical fiber element into an electric signal; and means for obtaining an amount of misregistration of the prescribed pattern from a desired position, where the prescribed pattern should be located, based on the detecting result of the detecting means.

23. A pattern misregistration detecting apparatus comprising:

an image carrier carrying a prescribed pattern;

means for moving the image carrier in a specified direction;

means for detecting the prescribed pattern on the image carrier, the detecting means including a light source, an optical fiber element for guiding a light from the light source onto the image carrier to obtain a reflected light from the image carrier, and a light receiving element for converting the reflected light into an electric signal; and means for obtaining an amount of misregistration of the prescribed pattern from a desired position, where the prescribed pattern should be located, based on the detecting result of the detecting means.

24. A pattern misregistration detecting apparatus comprising:

an image carrier carrying a prescribed pattern;

means for moving the image carrier in a specified direction;

means for detecting the prescribed pattern on the image carrier, the detecting means including a light source, a first optical fiber element for guiding a light from the light source and illuminating the image carrier to obtain a reflected light, a second optical fiber element for guiding the reflected light in a specified direction, and a light receiving element for converting the reflected light guided by the second optical fiber element into an electric signal; and means for obtaining an amount of misregistration of the prescribed pattern from a desired position, where the prescribed pattern should be located, based on the detecting result of the detecting means.

25. A pattern misregistration detecting apparatus as claimed in claim 24, wherein the second optical fiber element of the detecting means is arranged in line in a direction parallel to a moving direction of the image carrier against the first optical fiber element.

26. A pattern misregistration detecting apparatus as claimed in claim 24, wherein the second optical fiber element of the detecting means is arranged in line in a direction orthogonal to a moving direction of the image carrier against the first optical fiber element.

* * * * *